(12) United States Patent
Schreiber et al.

(10) Patent No.: US 12,478,441 B2
(45) Date of Patent: Nov. 25, 2025

(54) SURGICAL ROBOTIC PLATFORM FOR OPERATING WITHIN THE CONSTRAINED SPACE OF AN IMAGING SCANNER

(71) Applicant: The Regents of the University of California, Oakland, CA (US)

(72) Inventors: Dimitrious A. Schreiber, La Jolla, CA (US); Michael Yip, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 390 days.

(21) Appl. No.: 17/744,390

(22) Filed: May 13, 2022

(65) Prior Publication Data
US 2022/0378524 A1 Dec. 1, 2022

Related U.S. Application Data

(60) Provisional application No. 63/188,084, filed on May 13, 2021.

(51) Int. Cl.
*A61B 34/30* (2016.01)
*A61B 6/00* (2024.01)
(Continued)

(52) U.S. Cl.
CPC ............ *A61B 34/30* (2016.02); *A61B 6/4441* (2013.01); *A61B 6/582* (2013.01); *A61B 90/36* (2016.02);
(Continued)

(58) Field of Classification Search
CPC ....... A61B 34/30; A61B 90/36; A61B 6/4441; A61B 6/582; A61B 2034/107; A61B 2034/304
See application file for complete search history.

(56) References Cited

U.S. PATENT DOCUMENTS

2013/0296737 A1* 11/2013 Mcmillan .............. A61B 10/02
600/562

OTHER PUBLICATIONS

Masamune, et al., (1995. Development of an MRI-Compatible Needle Insertion Manipulator for Stereotactic Neurosurgery, Journal of Image Guided Surgery, 1:4, 242-248, DOI: 10.3109/10929089509106330. ePub Jan. 6, 2010 (Year: 1995).*
(Continued)

*Primary Examiner* — Tan-Uyen T Ho
*Assistant Examiner* — Cherie M Poland
(74) *Attorney, Agent, or Firm* — Stuart H. Mayer; Kaplan Breyer Schwarz LLP

(57) ABSTRACT

A surgical robotic platform operates within a constrained space of an imaging scanner in which a patient resides. The platform includes a gross positioning stage configured to be located outside of the constrained space An end-effector having a rotatable shaft is extendable from the gross positioning stage and into the constrained space of the imaging scanner. The shaft has a proximal end operatively coupled to the positioning stage outside of the constrained space and a distal end configured to be located in the constrained space. The distal end has a medical instrument gripper for holding a medical instrument used in a percutaneous procedure. The end-effector further includes a joint arrangement operatively coupling the shaft to the medical gripper for providing motion to the medical instrument gripper for enabling position and/or orientation control of the medical instrument. A drive module controls the joint arrangement.

29 Claims, 34 Drawing Sheets

(51) Int. Cl.
    *A61B 6/58*     (2024.01)
    *A61B 34/10*     (2016.01)
    *A61B 90/00*     (2016.01)

(52) U.S. Cl.
    CPC ... *A61B 2034/107* (2016.02); *A61B 2034/304* (2016.02)

(56) References Cited

OTHER PUBLICATIONS

Schreiber et al., arXiv.1903.0464v2[cs.RO] Aug. 16, 2019 (Year: 2019).*
Schreiber et al., arXiv:1910.03063v1 [cs.RO] Oct. 7, 2019 (Year: 2019).*
Dimitri A. Schreiber et al., "An Open-Source 7-Axis, Robotic Platform to Enable Dexterous Procedures within CT Scanners", presented at IROS 2019 in Macau China, 8 pp., https://github.com/ucsdarclab/Open-Source-CT-Biopsy-Robot.
Dimitri A. Schreiber et al., "Crane: A highly dexterous needle placement robot for evaluation of interventional radiology procedures", Oct. 7, 2019, 2 pp.

* cited by examiner

SURGICAL ROBOTIC PLATFORM FOR OPERATING WITHIN THE CONSTRAINED SPACE OF AN IMAGING SCANNER

CROSS REFERENCE TO RELATED APPLICATION

This application claims the benefit of U.S. provisional application Ser. No. 63/188,084, filed May 13, 2021, entitled "ROBOT WITH REDUNDANT ACTIVE DEGREES OF FREEDOM", the contents of which are incorporated herein by reference.

BACKGROUND

Interventional radiologists (IRs) perform minimally invasive procedures under real-time medical imaging guidance, such as ultrasound, fluoroscopy, computed tomography (CT), and magnetic resonance imaging (MRI). In recent years, percutaneous CT-guided procedures have increased dramatically in both type and frequency due to their decreased complications and recovery time in comparison with open-surgery and improved application availability enabled by technique and technological advances. They allow the minimally invasive diagnosis and therapy of numerous diseases, including cancer, chronic pain management, and reconstructive spinal surgery. Many needle-like tools are used, including fine needles for injection and aspiration, core-biopsy needles, and ablation probes. Additional medical instruments can include surgical blades, implantable screws, catheters, and implantable medical devices.

Typically, CT-guided procedures involve multiple steps where the IRs alternate between manually and incrementally advancing the needle-like tool and stepping away from the gantry to scan the patient. The multiple scans assist the physician in planning and controlling the insertion of the needle while compensating for physiological motion and avoiding anatomical obstacles on their needle insertion trajectory. The physician must balance understanding the in-body environment by scanning the patient and radiation exposure for both the patient and physician. This tradeoff directly effects tip-to-target accuracy. Frequently, the patient is withdrawn from the imaging bore for needle insertion between scans for improved ergonomics. The combination of delayed feedback and freehand control is difficult when high accuracy is required and forms the common problems of teleoperation-under-delay.

Robotics can improve tip-to-target accuracy and ergonomics while decreasing radiation exposure by providing real-time visualization of the system state and allowing for the precise adjustment of tools while the patient is within the bore.

SUMMARY

In one aspect, a dexterous in-bore needle insertion robotic platform is provided. In some embodiments the robotic platform is designed by defining and translating clinical considerations leading into engineering design considerations, including, for instance, abstract and measurable clinically motivated metrics for in-bore dexterity applicable to general-purpose intra-bore image-guided needle placement robots. In these particular embodiments the robotic platform may be referred to as a CT Robot and Needle Emplacer (CRANE), which satisfies these considerations. CRANE's design focuses on system dexterity: extending physicians' ability to manipulate and insert needles within the scanner bore as naturally as they would by hand. With this informed design approach, we have demonstrated that its redundant linkage design provides dexterity across a variety of human morphology and meets the clinical requirements for target accuracy during an in-situ evaluation.

In another aspect, a method for robot planning and automation within imaging bores is provided. The method includes a definition of clinical requirements for in-bore robotic manipulation with associated metrics for workspace and dexterity, which are used to evaluate the design of the robot and for control synthesis in a unified framework allowing physician task prioritization.

In another aspect, a platform for a robotic platform design that is configured for dexterity within an imaging bore is provided. In some embodiments, the robot design has a low profile and redundant serial links with verified in-bore dexterity across and high accuracy via multi-level closed-loop control. The device's workspace is fully active, providing physicians the ability to position and control the device without manual intervention. The platform employs a mechanism for grasping a needle. In some cases, the mechanism employs a clutching needle gripper using a Shape-Memory-Alloy (SMA) actuator, which enables deep needle insertion with short axis length via clutching.

In yet another embodiment, a surgical robotic platform is provided for operating within a constrained space of an imaging scanner in which a patient resides. The platform includes a gross positioning stage for providing larger-scale motion and configured to be located outside of the constrained space An end-effector having a rotatable shaft is extendable from the gross positioning stage and into the constrained space of the imaging scanner. The rotatable shaft has a proximal end operatively coupled to the gross positioning stage outside of the constrained space and a distal end configured to be located in the constrained space. The distal end has a medical instrument gripper for holding a medical instrument used in a percutaneous procedure. The end-effector further includes a joint arrangement operatively coupling the rotatable shaft to the medical gripper for providing smaller scale motion to the medical instrument gripper for enabling position and/or orientation control of the medical instrument. The proximal end of the rotatable shaft further includes a drive module for controlling joints in the joint arrangement such that in use the drive module remains external of the constrained space and the joint arrangement is located in the constrained space. The drive module actuates a roll joint and a pitch joint in the joint arrangement to thereby provide two active degrees of freedom for the end-effector.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DETAILED DESCRIPTION

Figure 1:
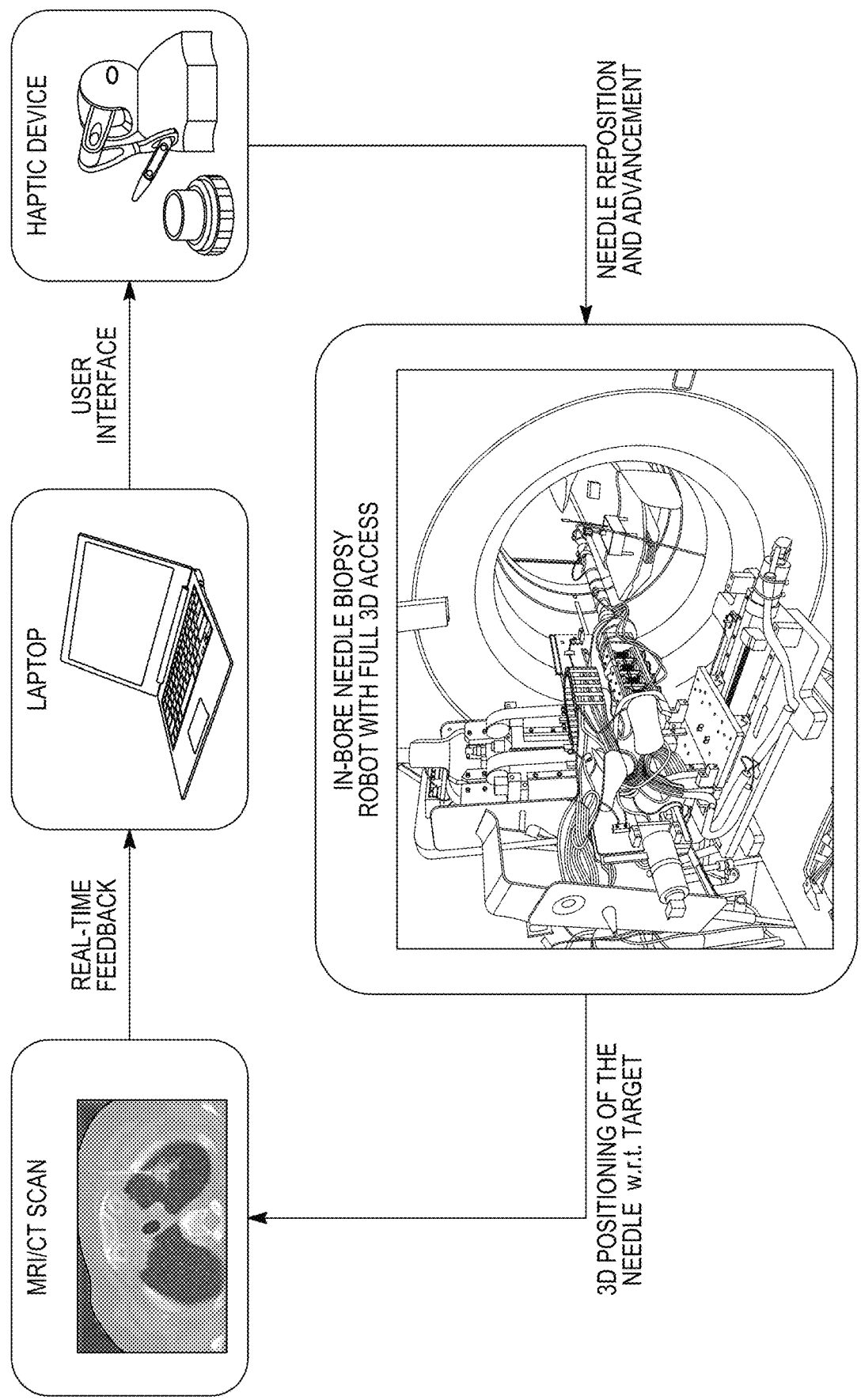
FIG. 1 shows a high-level overview of the process performed while using the surgical robotic platform described herein to insert a needle into the body of a patient who is undergoing real time in imaging while in a bore or other constrained environment of an imaging scanner.

Described herein is a surgical robotic platform for performing a percutaneous procedure in which a medical instrument such as a needle is inserted into a patient body while the patient body is located within a constrained space defined by an imaging scanner. For purposes of illustration only and not as limitation on the subject matter described herein, embodiments of the surgical robotic platform will be described in detail as being configured for a procedure in which the medical instrument is a needle and the imaging scanner is a computerized tomography (CT) scanner having a bore in which the patient body is located while the procedure is being performed. More generally, the methods, systems and techniques described herein may be used to provide a surgical robotic platform that can be used in a wide variety of different environments with a wide variety of different imaging scanners or the like, which provide a patient bore or other constrained space in which the patient 2502 and the relevant portion of the robot are located.

Overview of Image Guided Surgical Robotics

Surgical robotics generally need to carefully balance clinical value with workflow changes. User-interface, device control scheme, device kinematic structure, and needle interface method greatly effect clinical application and efficacy.

User interfaces and device setup methods can range from manual manipulation of the robot's joints to automatic control. With direct joint control, either via teleoperation or manual, the physician commands the robot joints to move and primarily uses the device as a mechanical guide. Here, the system helps a physician perform a static insertion trajectory in a stabile fashion and ergonomically achieve fine adjustment with few scans. Teleoperated end-effector control, either in robot coordinates or image coordinate frame, allows a physician to abstract away the device's joint motions and is frequently achieved via an inverse kinematics algorithm. This can allow a physician to directly make precise needle adjustments without worrying about the device's kinematics. However, the responsibility to consider potential collisions with obstacles in the environment and limitations of the robot's dexterity is left to the physician operators, which is cognitively challenging to keep track of.

Automated end-effector control with planning directly in imaging space can enable the physician to select their target needle insertion trajectory and let the robot solve for the associated motion planning problem. This allows the physician to focus on the higher-level surgical tasks and decreases the cognitive overhead of introducing a robotic system. Ideally, the physician can be confident in the system's ability to follow through on this task regardless of the specific patient and insertion location.

The surgical robotic platform described herein takes into account various design, analysis and planning considerations from multiple clinical cases. Among other things, the platform offers the ability to dexterously manipulate the needle around the nominal insertion point to enable adjustment for disturbances that may occur during insertion. For all surgical guidance (e.g., active robotics platforms, passive setup joints), setup can be time-consuming and difficult, frequently requiring reset up if joint limits are reached or environmental collisions occur.

Another consideration that is taken in account is the significant limitation of space that is available for in-bore image-guided needle insertions. Imaging scanners, such as a CT scanner, frequently consist of an imaging gantry and a couch. The imaging gantry has a bore, aperture or other constrained environment in which the patient 2502 resides when imaging. This constrained environment can be a physical bore, such as in a CT or MR scanner, or a virtual constraint, such as in a C-arm fluroscopy scanner or a medical linear accelerator. The couch has a base and a table on which the patient resides. Typically, the imaging gantry is stationary and the tabletop of the couch moves in and out of the more. In many procedures, it is valuable to insert and manipulate surgical instruments within the bore. The space available for manipulation is limited to the area between the patient, patient table, and the scanner bore. Withdrawing the patient from the scanner provides more working room. However, this increases the procedure time and the possibility of a mismatch between the previously captured image and the current patient state due to patient physiological motion. Working within the bore allows for shorter and more precise procedures but decreases the physician's ergonomics as they must reach between a limited scanner bore and patient.

Surgical robot platforms can enable more ergonomic manipulation of surgical instruments within the imaging bore and, with appropriate design, even increase the space available versus a physician by providing a lower profile. The surgical robot platform's mounting location, whether floor, scanner couch, or patient, sets many of the constraints and features for in-bore robotic needle insertion. Two areas of these effects are the devices workspace and dexterity. Floor-mounted platforms typically have simple setup and large workspaces but pose a safety risk in the case of relative motion between the patient on the scanner couch and the robot platform. Frequently, these use mobile-cart mounted industrial robots with a custom end-effector. This enables the device to be rolled into the operating room and to be stabilized against the operating table without requiring manual lifting or attachment to the table in way that if fails risks patient injury or device damage. Industrial robot arms on carts occupy a large space within the scanner bore, have large inertia, are not passively backdriveable, and have limited dexterity within the confined scanner bore. Additionally, they do not support rapid relative motion between the robot base and patient for instance due to the couch table moving for scanning. Couch-mounted systems are easy to set up for needle insertion into the patient and move with the patient for intraoperative scanning. However, they require attachment to the scanner, which poses a risk of system damage and patient injury in the case of improper fixation. Patient-mounted systems are small and intrinsically compensate for gross patient and table motion improvement. However, they frequently occupy more space in the scanner and possess less dexterity. Additionally, mounting to patients can be difficult in a fashion that balances point pressure application with sufficient stability and rigidity for accurate needle insertion.

Needle insertion mechanisms assist a physician in inserting the needle into the patient while maintaining a target orientation and position. They must be sterile, safe, and replaceable. Needle insertion mechanisms can be passive guides and active mechanisms. Passive guides orient and position the needle at the surface entry point from where the physician manually inserts the needle. They can decrease the unintentional application of torques and forces to the needle, decreasing accuracy. Active needle drivers enable precise and quick insertion while the physician can be remote and away from radiation. With all active designs, care must be taken to be compatible with the variety of needle-like instruments to provide sufficient gripping force to insert them without slipping while not damaging the probe itself (e.g., large hertzian contact stresses at the gripping point).

Clinical and Design Considerations for Robotic Needle Insertion

Depending on the target procedure, scanner, and patient anatomy, clinical considerations will differ. The following considerations are taken into account in some embodiments of robotic platform described herein. These considerations, and the resulting robot designs, are presented by way of illustration only and not as a limitation on the systems and techniques described herein. More generally, as previously mentioned, the robotic platform may be designed for use in a wide variety of different environments with a wide variety of different imaging scanners or the like, which provide a patient bore or other constrained space in which the patient and the relevant portion of the robot are located. Aspects of these more general designs will be discussed after first presenting designs for general purpose surgical tool insertion within an imaging bore, focuses on the meeting the following considerations.

In some cases, an image guided percutaneous surgical procedure has three main phases: Pre-operative Setup, Procedure Planning, and Procedure Execution. In the Pre-operative Setup Phase, which occurs before the surgery, preoperative images are reviewed, and the physician determines a rough plan of the procedure approach and the way they will position the patient within the scanner. At the beginning of the surgery, the patient is positioned on the scanner in a stable fashion to allow the insertion of the needle into the body in an ergonomic fashion.

In the Procedure Planning Phase, the trajectory for the needle through the body is planned, from which an initial needle insertion point is selected. This phase must consider the in-body obstacles (e.g., bone, blood vessels, other organs) and the confined space they are working in (e.g., imaging bore, patient) so as to not have the insertion tool collide with anything during scanning. Typically, this is done within the image captured via the medical scanner. The physician can select their preferred visualization (2D slices or 3D rendering) during this step within the scanner software.

During the Procedure Execution Phase the physician inserts the needle-like tool into the patient with the goal of ultimately reach the target point within their body. Needle insertion requires a Needle Manipulation Task, defined below. Frequently, the physician iteratively performs small adjustments and insertions with incremental will take multiple scans, looping back to Procedure Planning.

In a Needle Manipulation Task, the physician manipulates and applies forces to the base of the needle to guide the tip of the needle to the target point without hitting obstacles. Key considerations for this task include:

Force—must be applied to the needle to drive it through the body.

Dexterity—the medical instrument insertion's position and orientation must be adjusted which requires five cartesian degrees of freedom (DoFs): linear motion in the X, Y, Z axis and orientation motion in roll and pitch following scanner coordinates. A position and orientation can also be referred to together as a pose. Needles are symmetric or nearly symmetric about their roll axis. Bevel tip needles can exhibit steering effects and in this case an additional roll motion about the needle's axis is valuable. Needle steering is minimal for symmetric needles such as trocar star-point needles.

Collisions with environment—the needle should not hit the scanner bore and the doctor or assistive device must consider how they perform these manipulations within the bore or outside the bore. Forces must remain safe between the needle and patient, physician and other devices and patient, and all objects and the scanner itself. Collisions typically should be minimized between objects and the scanner itself and patient outside of the needle and stabilization to help with insertion of the needle into the patient.

Control resolution for fine adjustability—Unmodeled disturbances, including physiological motion and needle steering, can require adjustment during the procedure to achieve the required tip-to-target accuracy within the scanner image. Physicians frequently intraoperatively image and make minor needle adjustments to account for this.

Robotic surgery has many considerations which effect the design. Clinically, the robot must perform needle insertion safely within an imaging bore or other constrained environment. Depending on the target procedure or anatomy, considerations will differ. These considerations extend from the previously listed phases and tasks. Those embodiments of the robotic platform that are designed for in-bore biopsy, ablation, and drainage may focus on meeting the following clinical considerations. These considerations include the clinical workflow (focused on in-bore workspace and dexterity), the platform dexterity and control for positioning a needle, needle holder parameters, and safety. Each of these considerations will be discussed in turn below.

Regarding the clinical workflow, the device should be able to insert needles across the body at various angles to reach the target within the body. To do this, the device must be able to orient and position a needle at a nominal trajectory while retaining the dexterity to manipulate the needle around that nominal trajectory. Also, the device should be easy to move to the insertion pose, joint ranges should be large to minimize potential setup challenges for the user, requiring them to manually reposition the system. Moreover, due to the limited space within an imaging bore, the robot should have a low profile inside the scanner to maximize the space for needle manipulation and patient access.

Regarding platform dexterity and control for positioning a needle, the device should be accurate to support gross motions during setup and minimize the frequency of image updates required. The device should be able to insert standard needle-like instruments through soft tissue in any valid configuration. The device must be able to apply sufficient force in the needle's axial direction to insert through the body for the required task. Additionally, torques and in-plane forces can be required to adjust the needle angulation during insertion. Unmodeled disturbances, including physiological motion and needle steering, can require adjustment during the procedure to achieve the required tip-to-target accuracy within the scanner image. Physicians frequently intraoperatively image and make minor needle adjustments to account for this. Accordingly, the device should have control resolution for fine adjustability. There should also be alignment between the robot and the imager's coordinate system to enable the physician to work directly within the imaging space where they perform planning. Alignment should be automatic and accurate to minimize cognitive load, room for error, and procedure time.

Regarding the needle holder, which is the mechanism for holding the needle and attaching to the arm of the robot, it should have sufficient grip strength to be able to insert tools without slipping during insertion while disengaging and allowing manual manipulation. It should also have a long insertion depth since targets can be deep across the body. Body habitus limits space within the bore and rarely requires partial needle insertion outside of the bore to clear the gantry. Therefore, long insertions must be performed required with a limited length end-effector.

Regarding safety, the methods and components should enable safe system operation in the case of system-off or system failure. In particular, in some embodiments the system should be passively backdriveable, allowing the physician to manipulate the device even when off. This enables easy removal in the case of system failure or a patient emergency. There may also be redundant sensors. The system state should be observed by multiple independent sensors for error detection and voting in the case of failure of a single sensor. In addition, imaging artifacts caused by high Hounsfield Unit materials must be minimized to retain high tissue contrast and image interpretability.

System Design

In some embodiments the design of the surgical robotic platform focuses on dexterity, accuracy, and safety within an imaging bore. In this section, we describe the details of how the system achieves clinical and engineering requirements, with performance of a particular embodiment summarized in Table 1. The design of the surgical robotic platform is for operating within a constrained space of an imaging scanner in which a patient resides. The robotic surgical platform has mechanical, electrical, and software components. FIG. 1 shows a high-level overview of the process performed while using the surgical robotic platform described herein to insert a needle into the body of a patient who is undergoing real time in imaging while in a bore or other constrained environment of an imaging scanner. The figure shows the primary system components, which include the robot, a user interactive and control computer system, a user input device, and a connection to the imaging scanner to retrieve imaging data.

Figure 2:
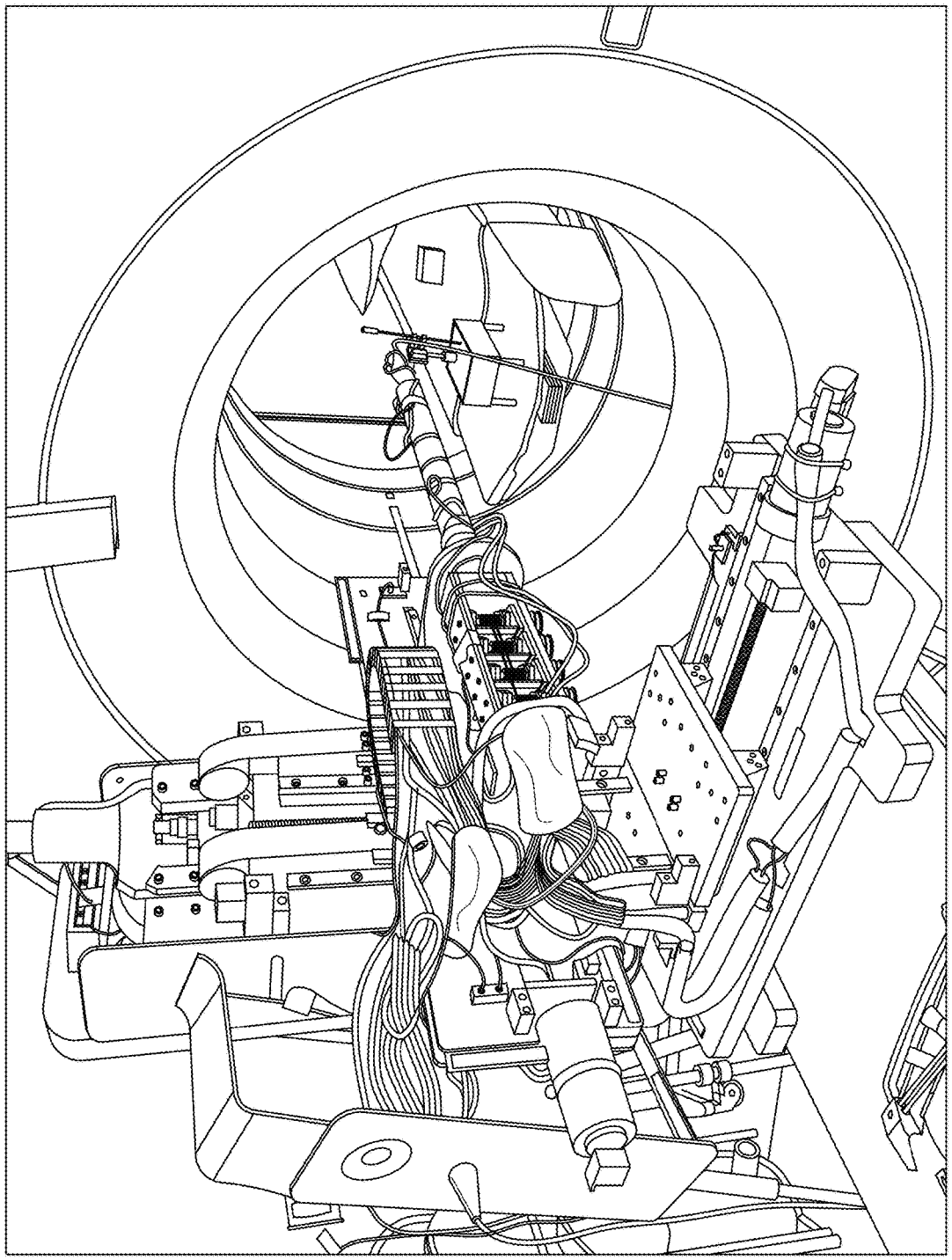
FIG. 2 shows a photograph of one example of the surgical robotic platform reaching into a scanner imaging bore.

FIG. 2 shows a photograph of one example of the surgical robotic platform reaching into a scanner imaging bore. The mechanical design enables the dexterous manipulation of surgical tools within the gantry or other constrained space of an imaging device (e.g., CT scanner) where the patient resides. Other potential scanners include Magnetic Resonance Imaging (MRI) scanners, Positron Emission Tomography (PET) scanners, and Fluoroscopy scanners. Fluoroscopy scanners frequently include a rotateable flouroscope which constrains the available space and functions as a virtual bore. The device design maximizes in-bore dexterity and active workspace while retaining a low profile within the gantry.

Described herein is a surgical robotic platform for performing a percutaneous procedure in which a medical instrument such as a needle is inserted into a patient body while the patient body is located within a constrained space defined by an imaging scanner. For purposes of illustration only and not as limitation on the subject matter described herein, embodiments of the surgical robotic platform will be described in detail as being configured for a procedure in which the medical instrument is a needle and the imaging scanner is a computerized tomography (CT) scanner having a bore in which the patient body is located while the procedure is being performed. More generally, the methods, systems and techniques described herein may be used to provide a surgical robotic platform that can be used in a wide variety of different environments with a wide variety of different imaging scanners or the like, which provide a patient bore or other constrained space in which the patient 2502 and the relevant portion of the robot are located.

Clinical and Design Considerations for Robotic Needle Insertion

The mechanical design of the surgical robotic platform described herein enables the dexterous manipulation of surgical tools within the gantry or other constrained space of an imaging device (e.g., CT scanner) where the patient resides. The device design maximizes in-bore dexterity and active workspace while retaining a low profile within the gantry. As described above, this task requires manipulation with 3 cartesian position constraints and two cartesian orientation constraints. Therefore, the device must have at least 5 degrees of freedom to solve for this primary task requirement. Additionally, the robotic platform cannot collide with any objects within the space (e.g., scanner gantry, patient) and should retain a minimum buffer from nearby obstacles while inserting and manipulating the needle for safety, mechanisms have singularities where they lose the ability to manipulate in certain directions, and physicians may have other preferences on robot configuration. Redundant joints can provide a method to optimize for these multiple secondary objectives.

Figure 3:
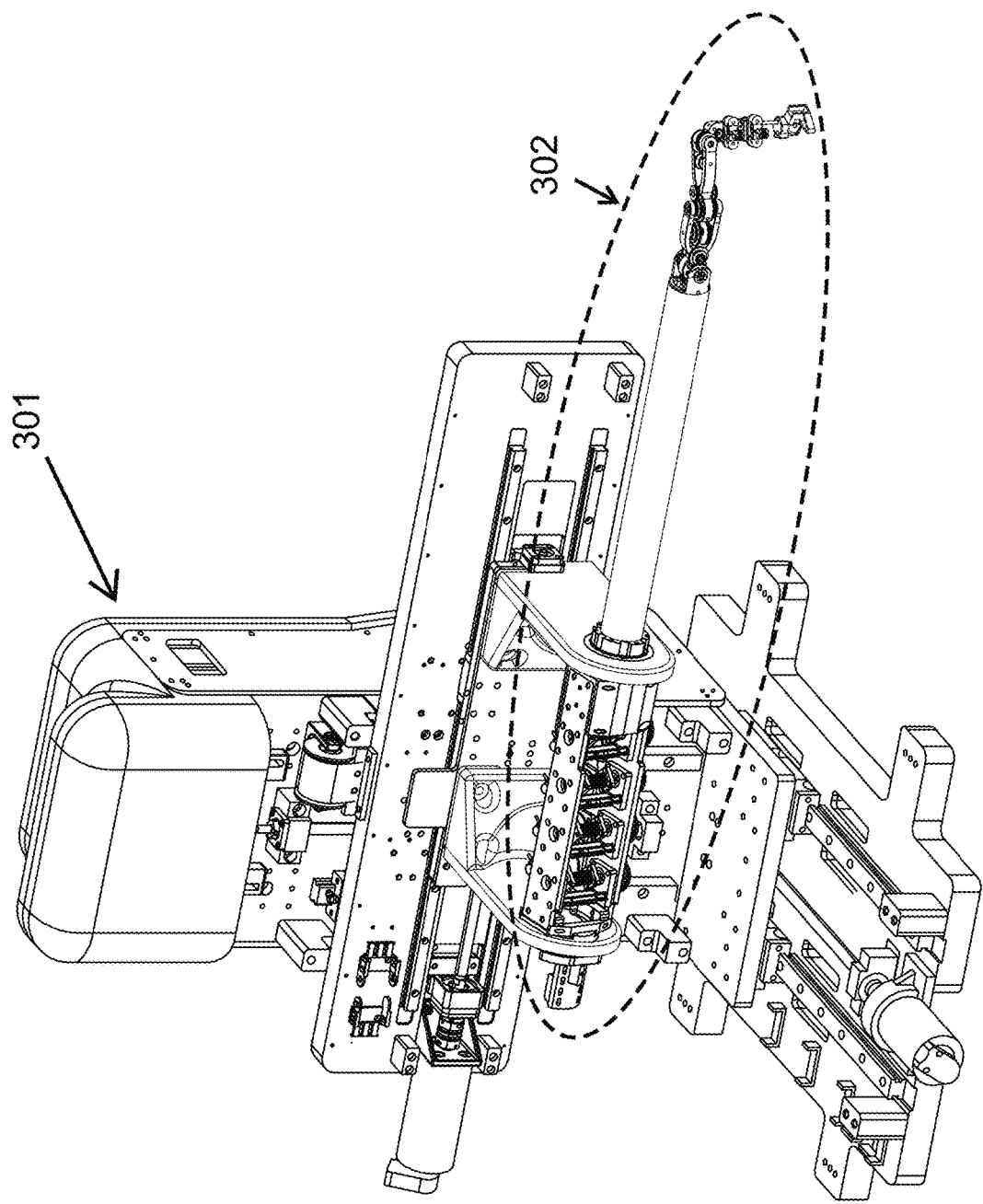
FIG. 3 shows a schematic diagram of one embodiment of the surgical robotic platform in a perspective view, illustrating its primary mechanical components.

FIG. 3 shows a schematic diagram of the surgical robotic platform in a perspective view, illustrating its primary mechanical components. These components include a gross positioning stage 301 and an end-effector 302. The gross positioning stage provides large-scale motion enabling gross movements during device setup without requiring manual repositioning of the system or patient. The end-effector is attached to the gross positioning stage and provides orientation motion within the tightly constrained space between the scanner bore 2501 and the patient 2502 and the has the ability to reach around obstacles within the space. The end-effector includes a proximal trunnion assembly and distal joint arrangement 603. These components are coupled through the shaft 602. The end-effector can additionally provide the ability to control the needle's position redundantly.

The redundant joints enable multiple configurations which can reach the target needle insertion pose and assist in reaching around the patient's body while maintaining dexterity. In total, the robotic platform has 8-actuated joints for a 5-DoF problem space. As the final joint is dedicated for needle insertion, the remaining 7-actuated joints are available for dexterous needle manipulation. This provides the system with two redundant degrees of freedom for secondary criteria optimization (e.g., dexterity, collision avoidance) while satisfying the primary constraint (e.g., satisfying the target needle insertion point and adjustments.

Figure 4:
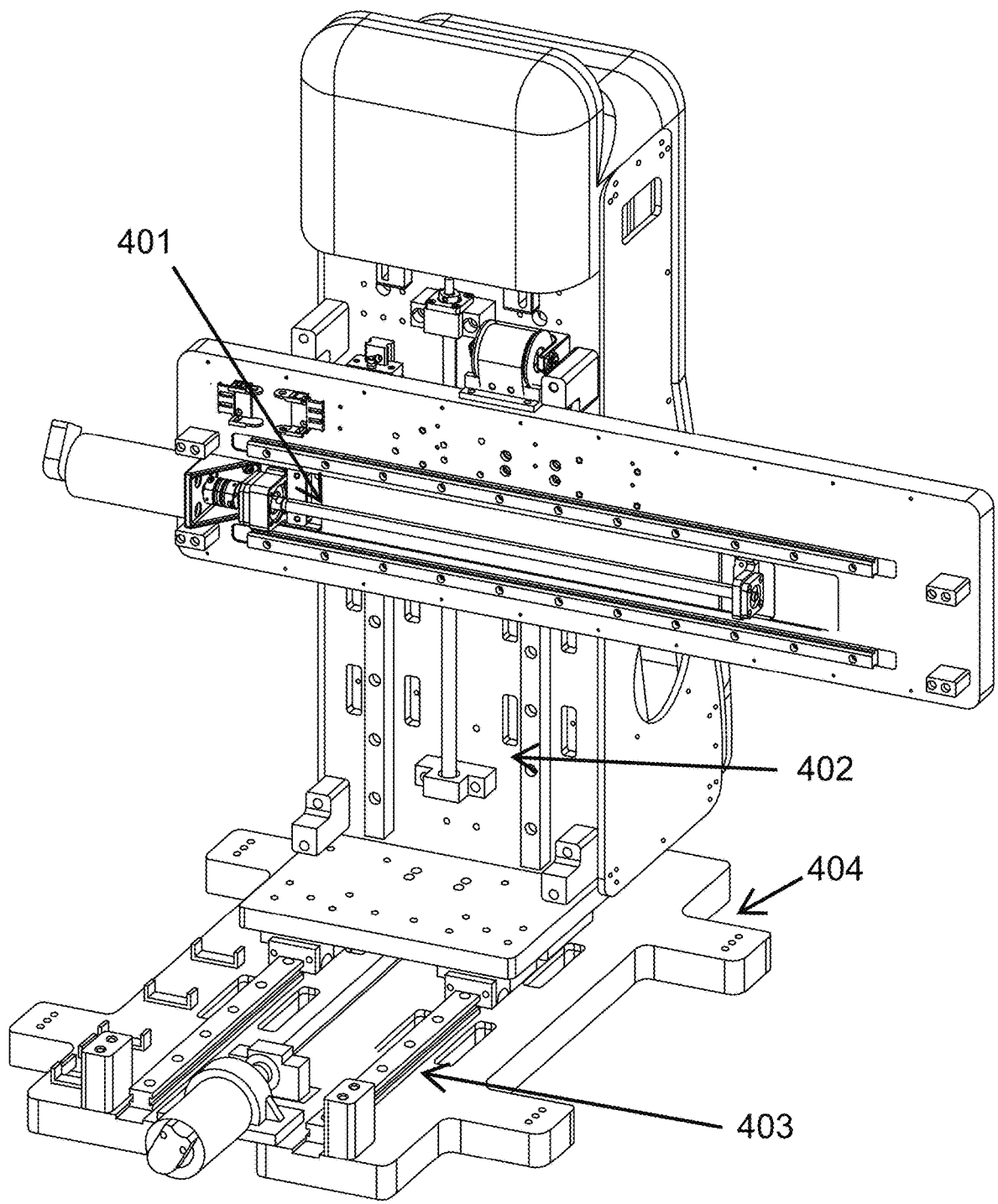
FIG. 4 shows the gross positioning stage of the surgical robotic platform of FIG. 3.

The gross positioning stage 301, shown in more detail in FIG. 4, provides larger scale motion and is configured to be located outside of the constrained space of the imaging bore. The end-effector 302 is attached to the gross positioning stage and described below. In the illustrated embodiment, the base 404, seen in FIGS. 2-4, is a highly rigid and accurate 3-DoF linear motion stage serially linked to a 5-DoF end-effector. The gross positioning stage joints can be actively or passively controlled. If actively controlled, an actuator is used to power the joint and is controlled remotely by the user. If passively controlled, the user manually adjusts the joint. Additionally, the gross positioning stage can be passively controlled without the inclusion of actuators. FIG. 4 shows additional components of this embodiment of the base 404. In the illustrated embodiment, the gross positioning stage has 3-DoF provided by actuated X-axis, Y-axis, and Z-axis prismatic joints, as shown in FIG. 4. These three axes are serially linked. The gross positioning stage's base couples the Surgical Robot Platform to the ground. The ground is typically the patient couch on which the patient resides. Additionally, the ground can be an integrated base such as a cart which directly rests on the floor of the operating room. Additionally, the gross positioning stage's base can be attached to the scanner, including the scanner's gantry. The x-axis prismatic joint 403 couples the base to the x-axis prismatic link and provides actuation and relative motion between these two links. The z-axis prismatic joint 402 couples the x-axis prismatic link to the z-axis prismatic link and provides actuation and relative motion between these two links. The y-axis prismatic joint 401 couples the end-effector to the z-axis prismatic link and provides actuation and relative motion between these two links. The gross positioning stage achieves high precision, low friction, low gear-ratio, and low inertia through high-lead ballscrews, coreless motors, and recirculating ball linear rails.

Figure 5:
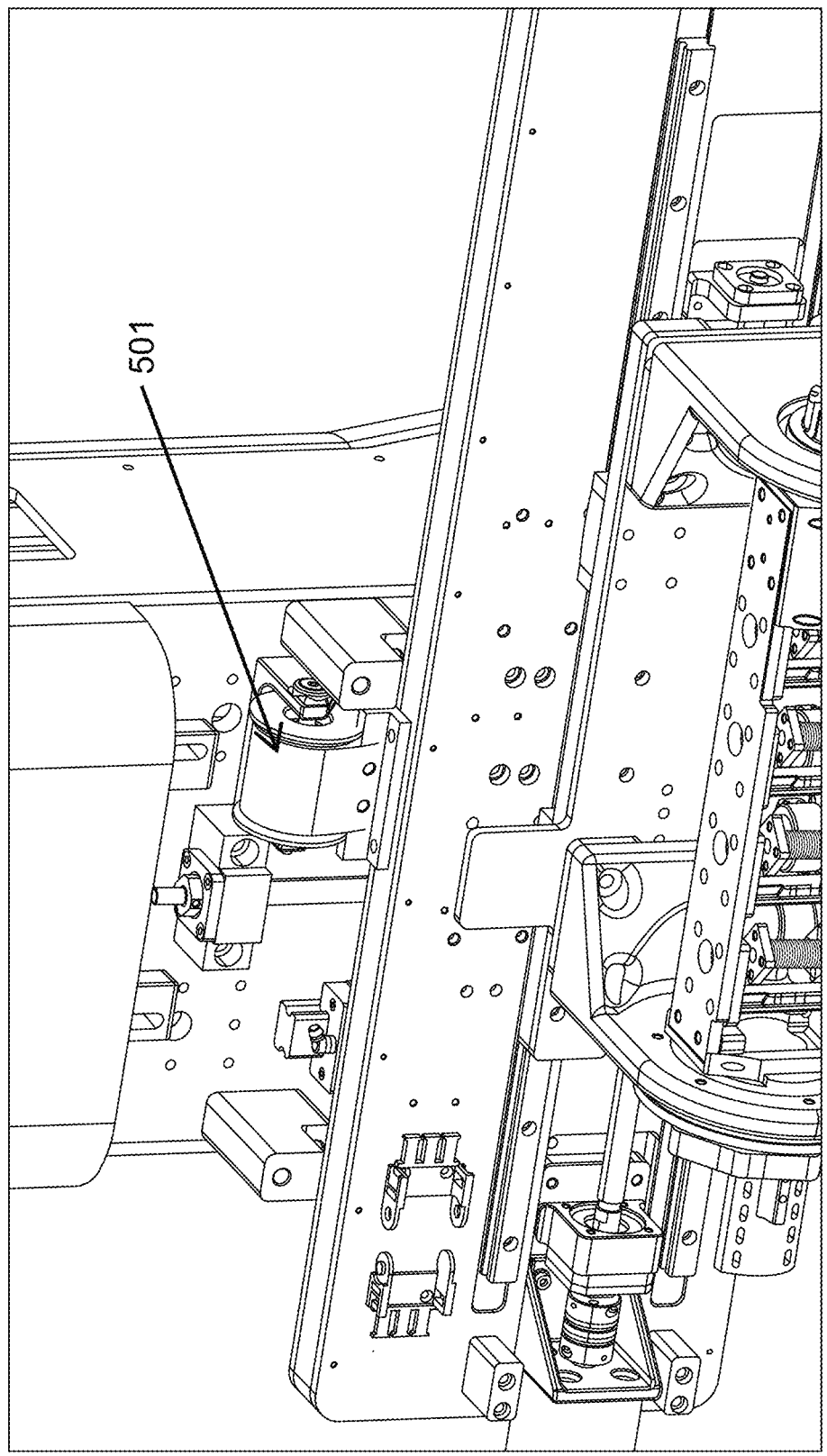
FIG. 5 shows a detailed view of the gravity counterbalance mechanism employed in the gross positioning stage.

For safety, the gross positioning stage 301 fails passively: the joints can be manually positioned and gravity counterbalanced. Manual positioning is achieved by minimizing system inertia and damping. The gross positioning stage's z-axis link and y-axis prismatic joint 401 and the end-effector mounted are counterbalanced via a gravity counterbalance mechanism 501 (e.g., constant force springs) to prevent large forces or motion in the case of power-off. An implementation of the gravity counterbalance mechanism is shown in FIG. 5. Here the gravity counterbalance is implemented via a constant force spring mounted to the x-axis link and acting up the z-axis link, applying an effective force parallel to the z-axis prismatic joint 402 to counteract the force of gravity on the Z-axis and following links.

Those of ordinary skill in the art will recognize that the various features and functions of the surgical robotic platform described herein may be implemented using other mechanisms, other serial, parallel, and hybrid kinematic structures, and numerous types of joints (e.g., prismatic, revolute, spherical, etc.). In addition, numerous actuation schemes are also possible (e.g., brushed and brushless motors, hydraulics, pneumatics, etc.).

FIG. 3 shows the end-effector 302 mounted to the gross positioning stage 301. As further shown in FIG. 3, the end-effector includes a trunnion assembly, shaft 602, and joint arrangement 603. Additional details concerning the end-effector and its components are illustrated in FIGS. 3, 6, 7-16.

Figure 6:
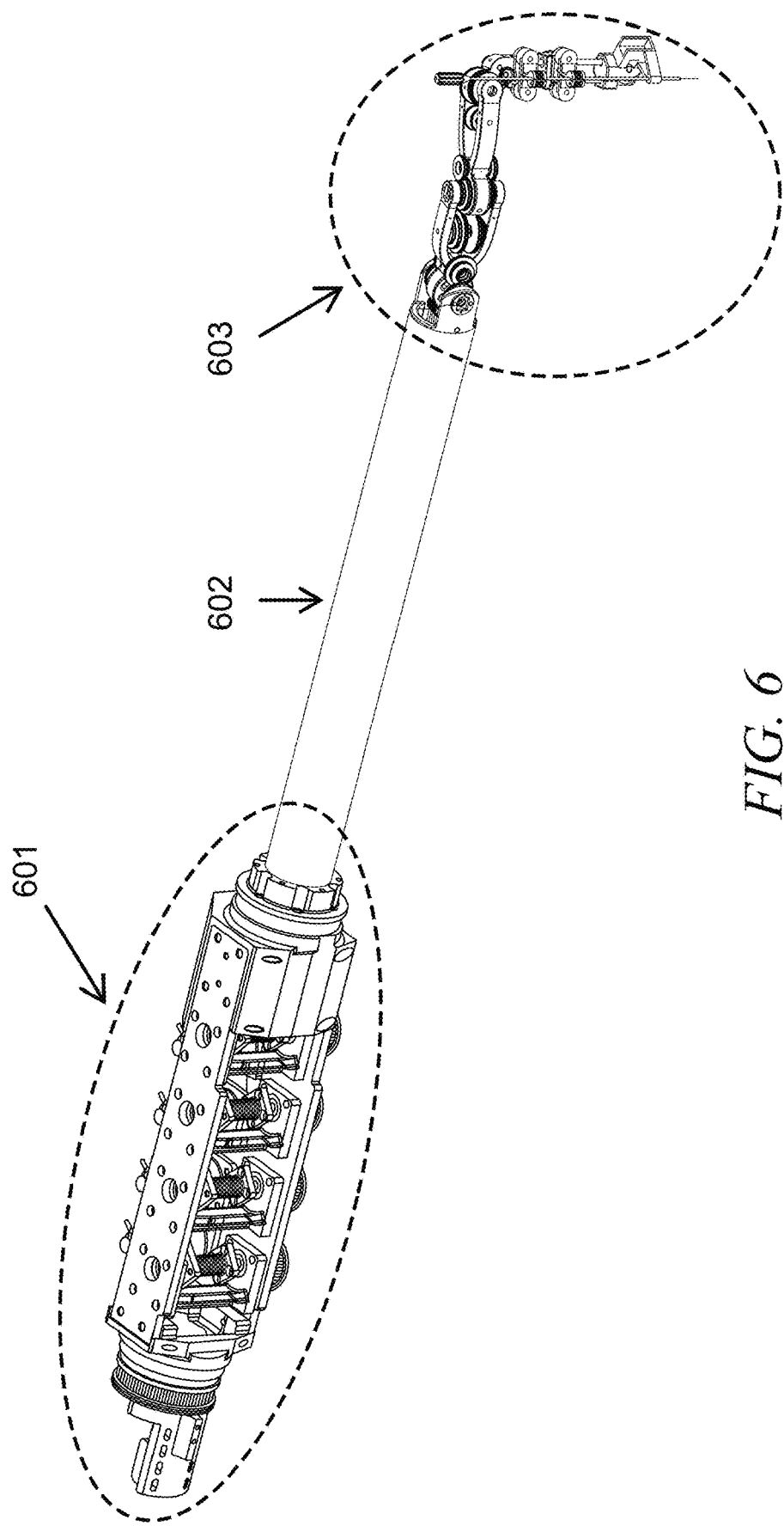
FIG. 6 shows the end-effector employed in the surgical robotic platform of FIG. 3.

The trunnion assembly, shown in FIG. 3, includes an active roll joint 704 which rotates the more distal components of the end-effector 302. The drive module arrangement 601, shown in FIG. 6, is a part of the trunnion assembly and incorporates a revolute joint which rotates about the axis coaxial with the shaft's long axis reaching into the bore. The roll joint motion is supplied via the trunion pulley 703 (shown in FIG. 7) from a motor mounted to the base of the trunnion assembly. This provides a roll DoF for the joint arrangement.

As further shown in FIGS. 3 and 6, the joint arrangement 603 is structurally coupled to the trunnion assembly via the shaft 602 through the drive module arrangement. The joint arrangement is remotely actuated via the joint cables 1103 running along the shaft by actuators 702 housed within the drive module arrangement.

Figure 7:
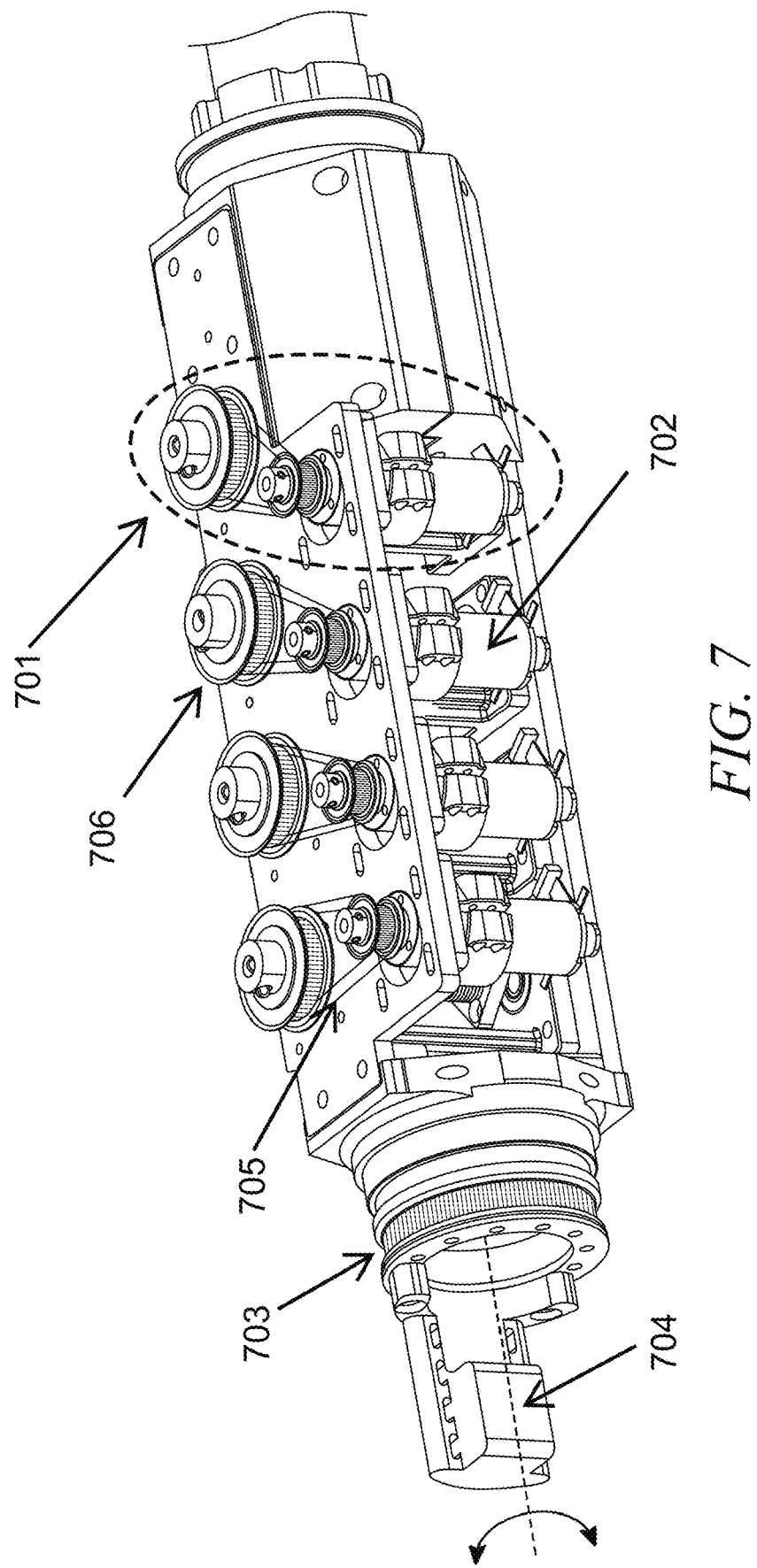
FIG. 7 shows the drive module arrangement employed in the trunion assembly shown in FIG. 3.
Figure 8:
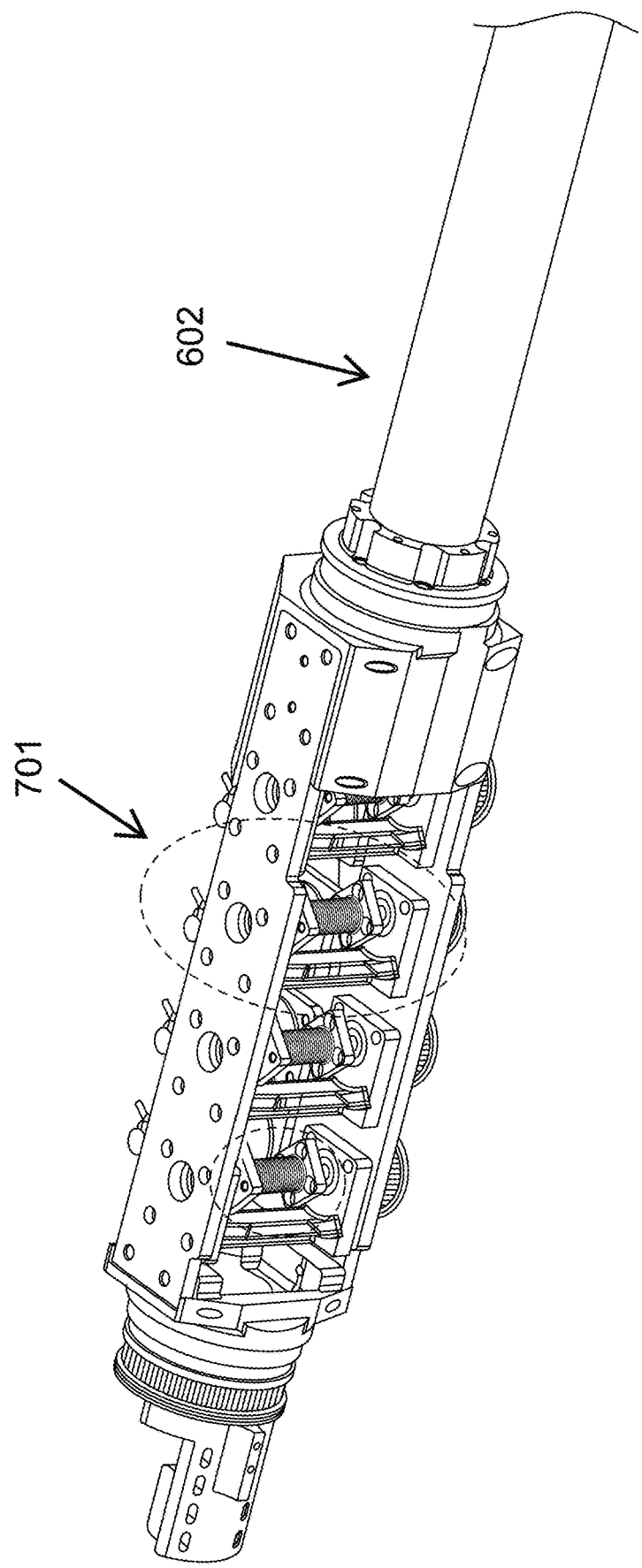
FIG. 8 shows another view of the drive module arrangement without the packaging belts and pulleys.

The drive module arrangement, shown in more detail in FIGS. 7 and 8, consists of multiple drive modules 701. The drive modules provide actuate the joint cables 1103 via capstan drives which are operably coupled to actuators 702 via the packaging belts 705 and the packaging pulleys 706. All end-effector 302 joints can be actively or passively controlled enabling actuated or manual positioning of the end-effector.

Figure 9:
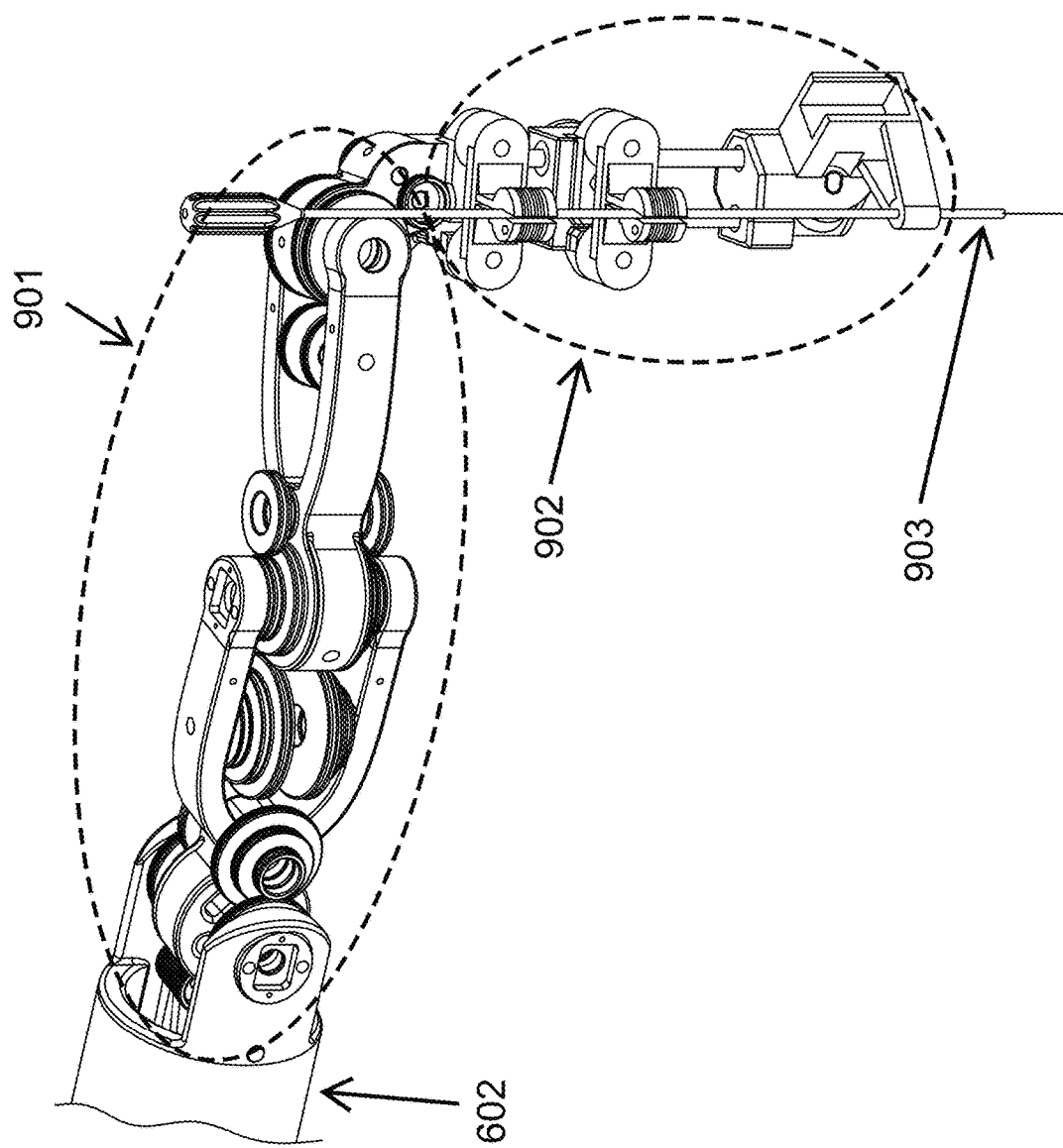
FIGS. 9-11 show additional details of the joint arrangement located on the distal end of the end-effector.

As shown in FIG. 9, the joint arrangement 603 has two primary logical groupings of joints: the fine motion joints 901 and the joints associated with the needle insertion mechanism 902. All joints within the joint arrangement are actuated remotely via the joint cables 1103, as further illustrated in FIGS. 8, 11, 14, 17, 18, 19, 20, 21. While we use the term cables throughout, these cables can be replaced with other flexible transmission elements including belts and bands in other implementations. The idler pulley 1101 (shown in FIG. 11) placement guides the joint cables throughout the end-effector 302 with nearly constant tangency on the capstan drive pulley (shown in FIG. 8), idler pulley and final terminating pulley at which the terminating cable 3101 ends. Therefore, there is minimal cable loop length change, providing nearly constant cable preload irrespective of joint position. Cable transmissions can provide a constant mechanical advantage and large joint range with flexible 3D routing. Idler pulleys are placed coaxially with actuated joints for which the cables do not continue for re-routing of cables to further distal actuated joints.

Figure 10:
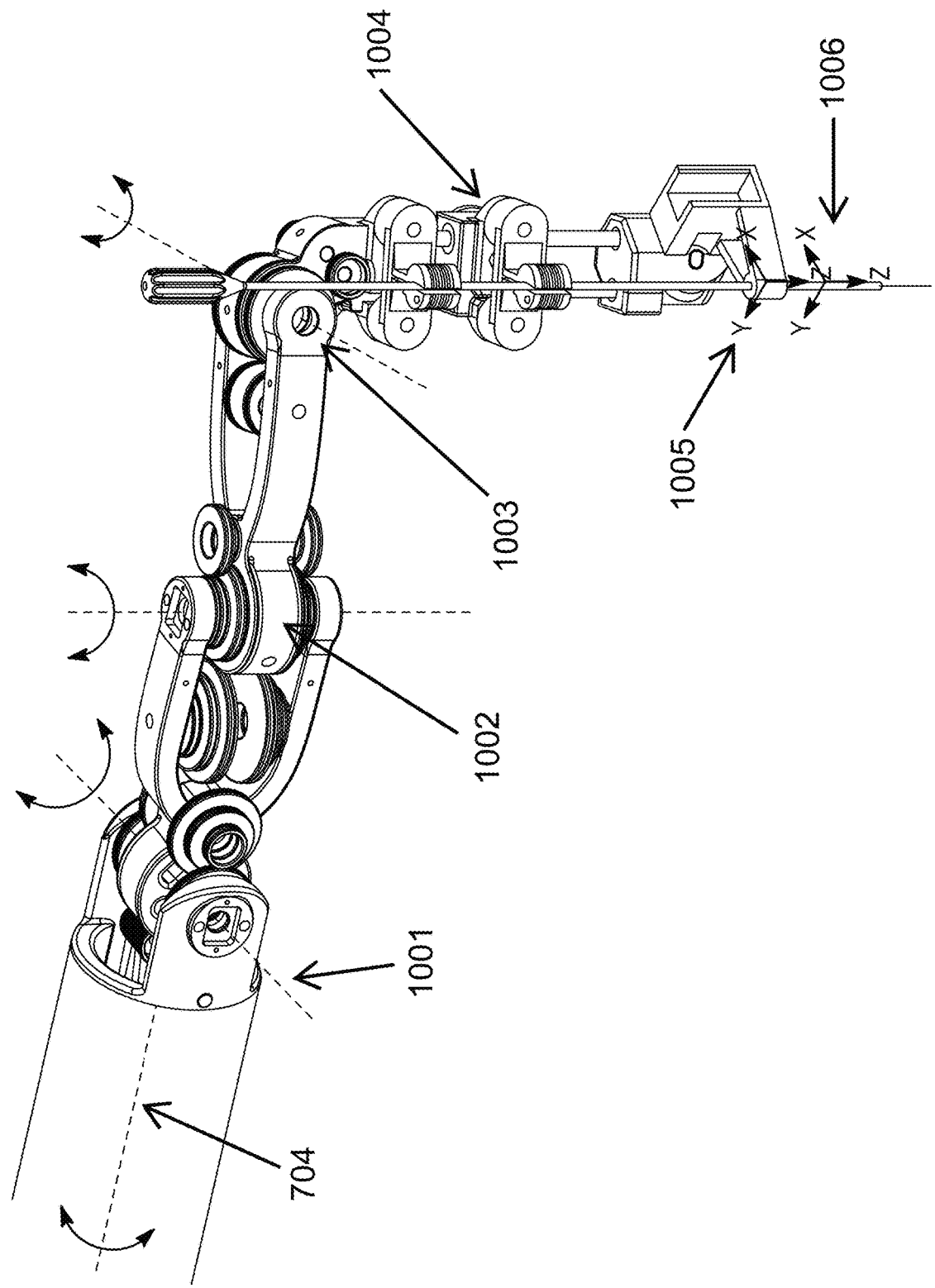
Figure 11:
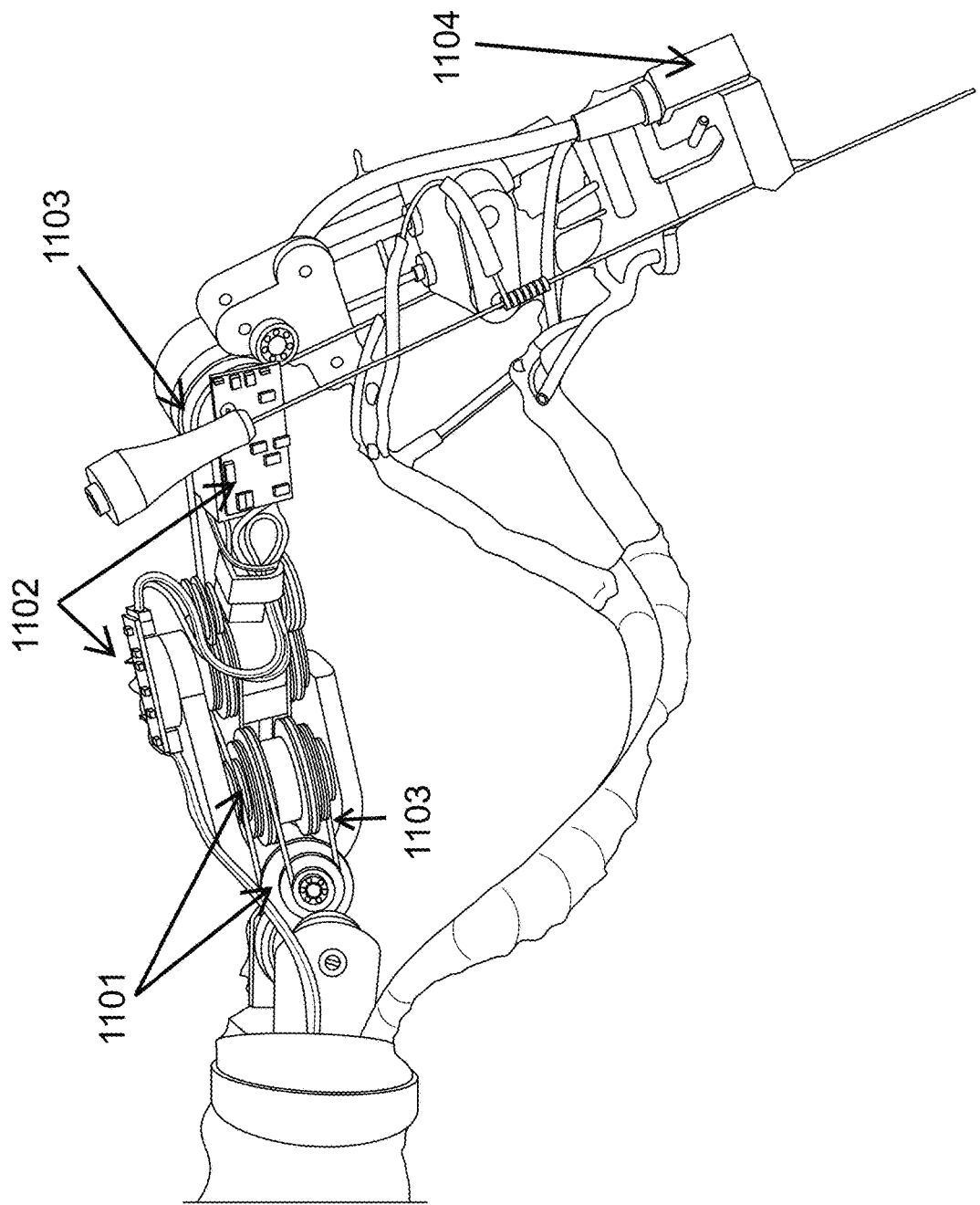
Figure 12:
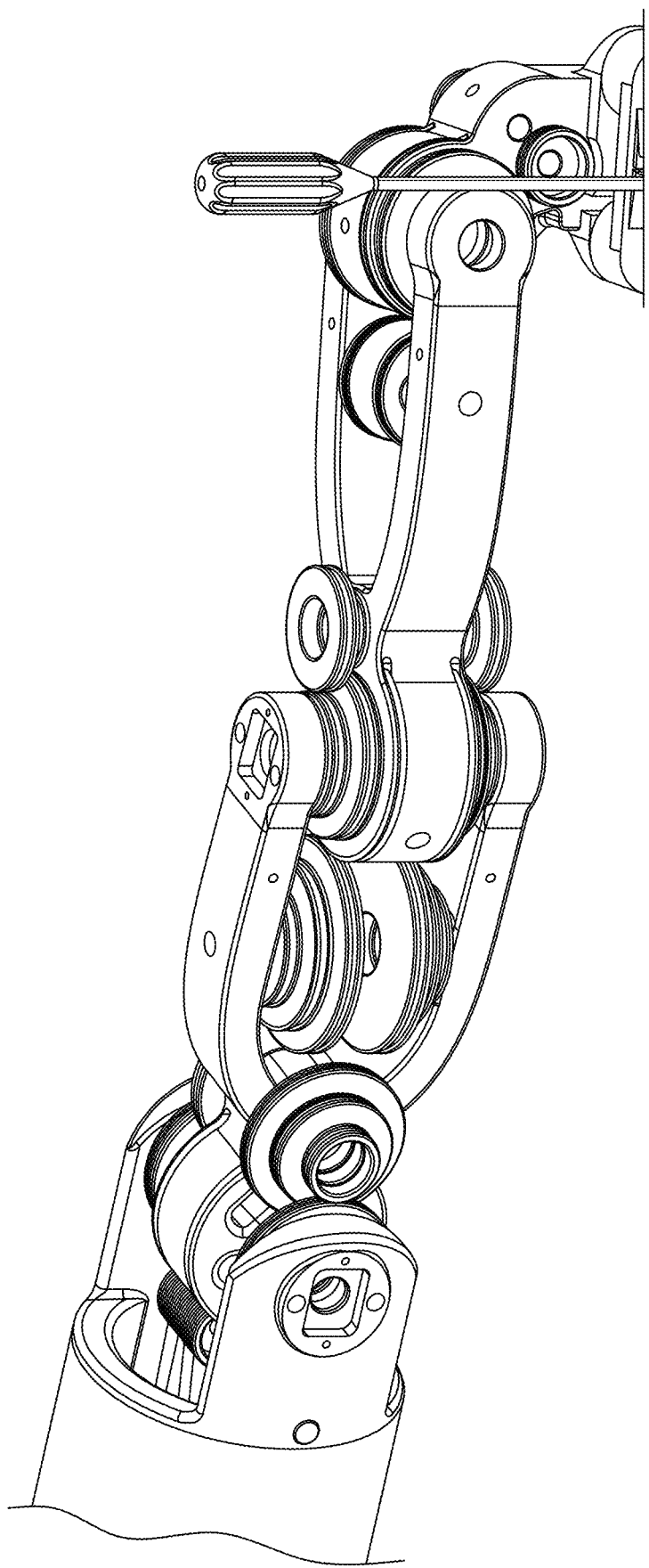
FIG. 12 shows additional details of the fine motor joints employed in the joint arrangement.

The fine motion joints 901 in the joint arrangement 603 provide 3-DoF for needle positioning and angulation while reaching around obstacles. The fine motion joints include serially linked revolute joints driven by cables running from the drive module 701 through the into-bore shaft 602. The pitch joint 1003 and roll joint 704, shown in FIGS. 7 and 10, provide the primary orientation requirements for needle insertion and when combined with the gross positioning stage's 3 linear DoFs. Together, these provide the 5-DoF required for needle insertion. The redundant pitch joint 1001 and yaw joint 1002 provide two redundant DoFs, which can be used for secondary objective optimization with a control and planning approach using those described below. Among other things, these approaches can enable the device to reach across the patient's body (e.g., around the stomach) while changing the pivot point within the body virtually.

Figure 20:
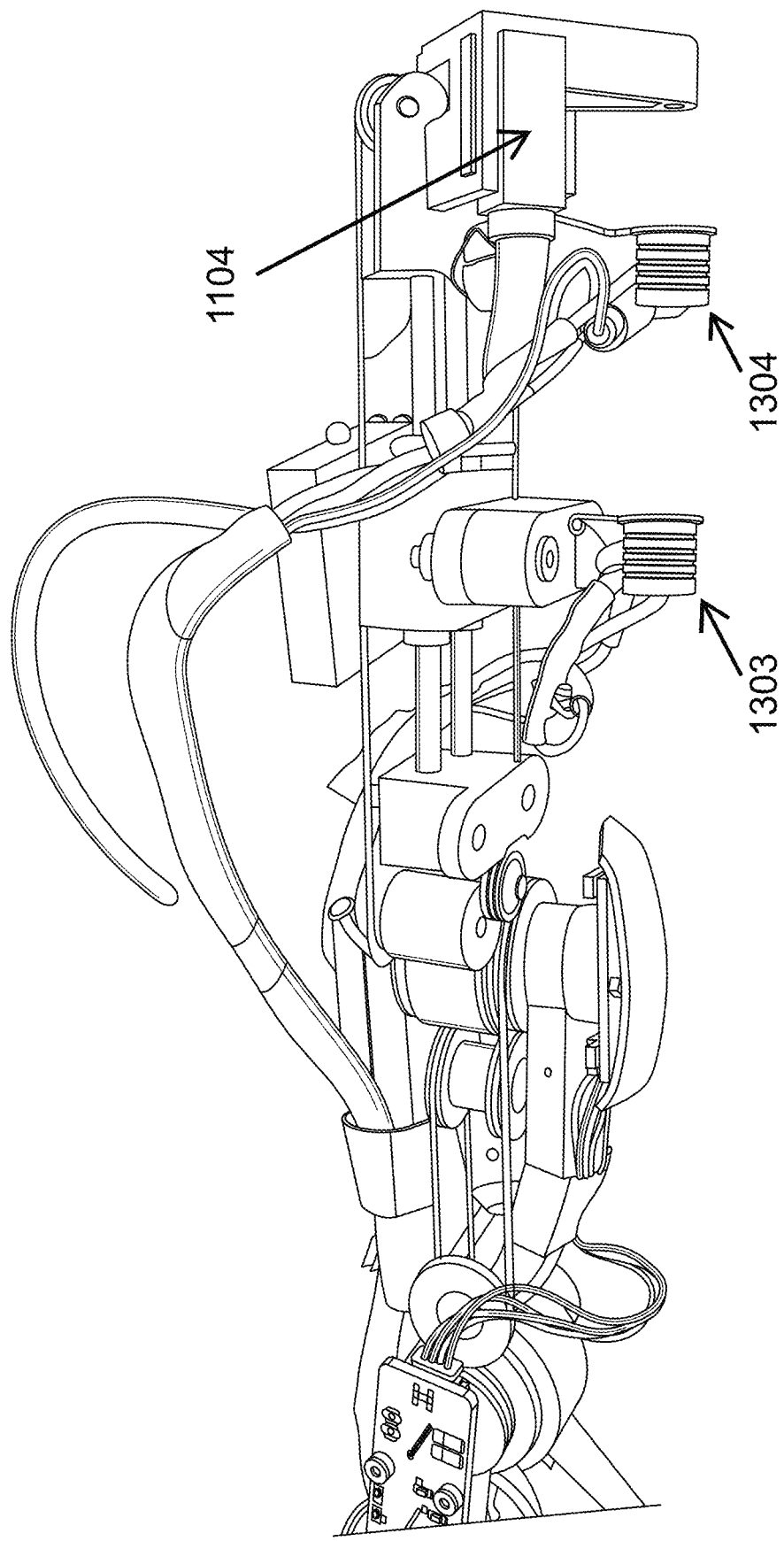
FIGS. 20 and 21 show additional views of the joint arrangement illustrating the inverted needle gripper locations.
Figure 21:
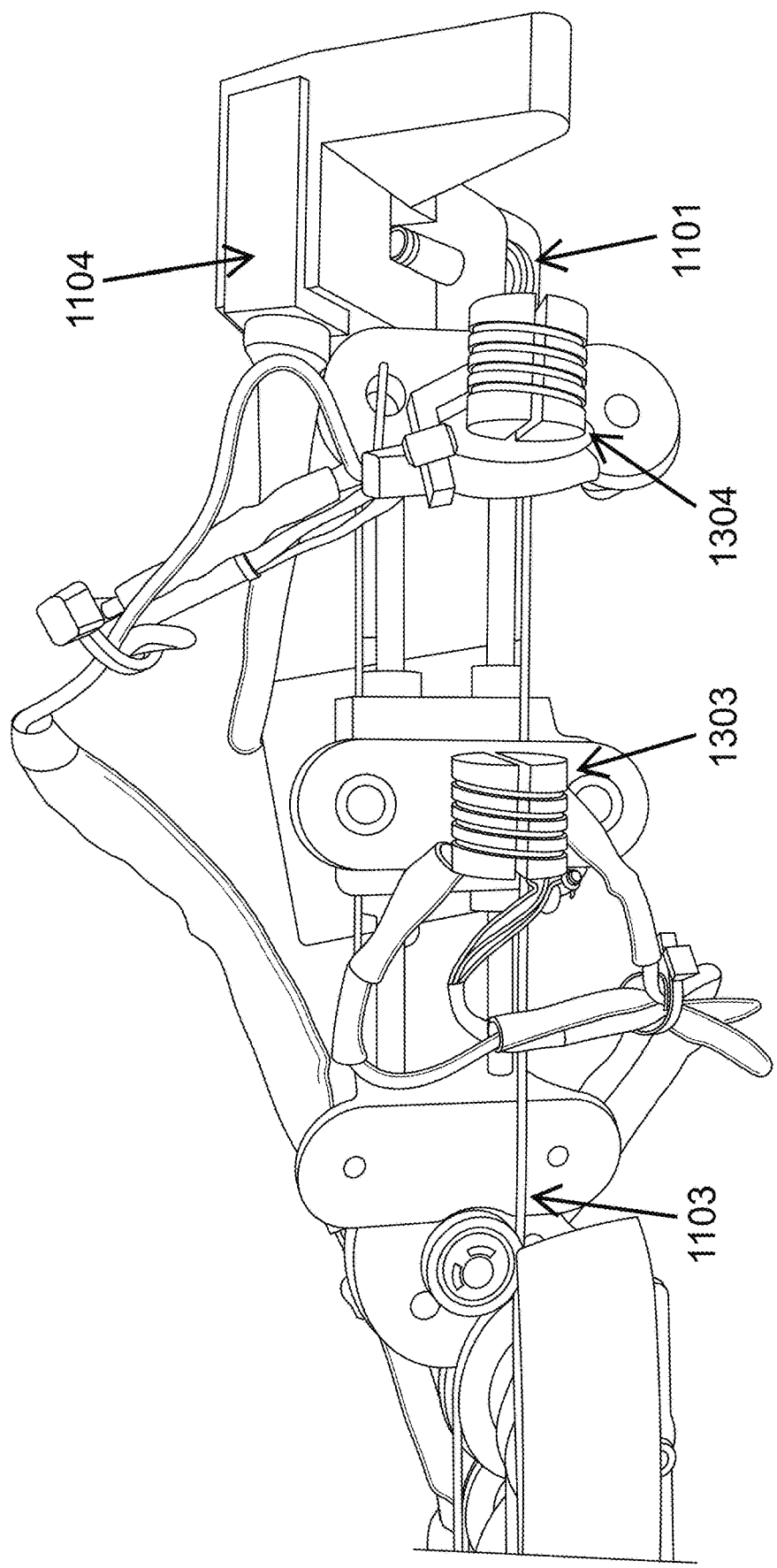

The needle insertion mechanism 902, initially shown in FIG. 9, connects the needle 903 with the more proximal fine motion joints 901 and provides a method for guiding or inserting the needle into the patient's body. The needle insertion mechanism's insertion joint can be actively or passively controlled. If actively controlled, an actuator 702 is used to power the joint and is controlled remotely by the user. If passively controlled, the user manually adjusts the joint. Additionally, the needle insertion mechanism may serve only as a passive guide without the inclusion of a insertion joint. The needle insertion mechanism may include a stationary needle gripper 1304 and a moving needle gripper 1303, shown in FIGS. 13 and 14 as a method of implementing long travel needle insertion with a limited travel prismatic axis. In some embodiments a clutching insertion method may be used to achieve long travel needle insertions in a constrained space. FIGS. 20 and 21 illustrate an alternative configuration of the needle gripper within the needle insertion mechanism where the stationary needle gripper is further distal and the moving needle gripper is more proximal.

Figure 15:
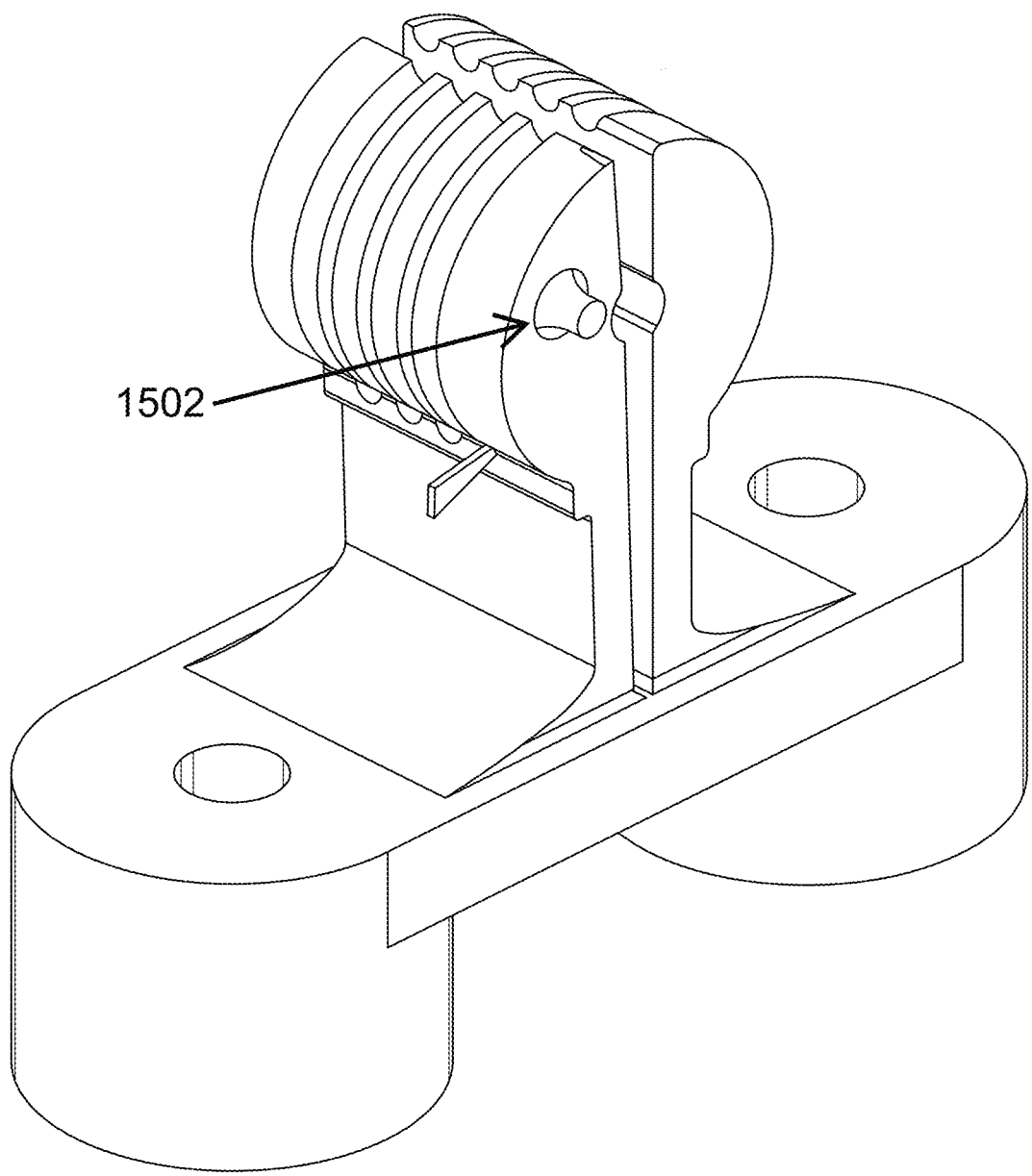
FIG. 15 shows the needle gripper employed in the needle insertion mechanism.

The needle guide 1302 is a guide close to the percanteous insertion point. This provides a measurement of the needle state close to where it leaves the robot and can improve tracking accuracy. A final revolute joint can be further included co-axial to the needle 903 if direct needle roll control is needed. The needle gripper, illustrated in detail in FIG. 15, provides a mechanism for gripping the needle. The proposed needle gripper design uses a Shape Memory Alloy wire actuator helically wrapped around a flexure which cages the needle. The gripper has a fail-passive behavior, improving safety when off and acting as a guide which the physician can use for manual needle insertion. When heated, the wire contracts due to a crystalline structure change from Martensite to Austenite. The needle gripper can include a temperature sensor 1502 (e.g., thermistor, thermocouple, non-contact IR sensor), which can directly measure temperature based on electrical property changes (resistance, inductance, etc.), or can be modeled based on thermodynamics. Additionally, the gripper can be heated and cooled via forced air. The needle gripper can additionally be excluded if active gripping is not needed for an implementation.

The gripper can be actuated via Joule heating when a current is run through the Shape Memory Actuator directly. Actuation of the Shape Memory Alloy actuator and the resulting change in length applies a force on the needle gripper actuator crimp, compressing the flexure into the needle 903 and grounding the needle to the clutch's link. Two needle grippers may be placed in series within the needle insertion mechanism, one serving as a grounded brake to prevent needle motion and the other on the final prismatic needle insertion link.

Figure 16:
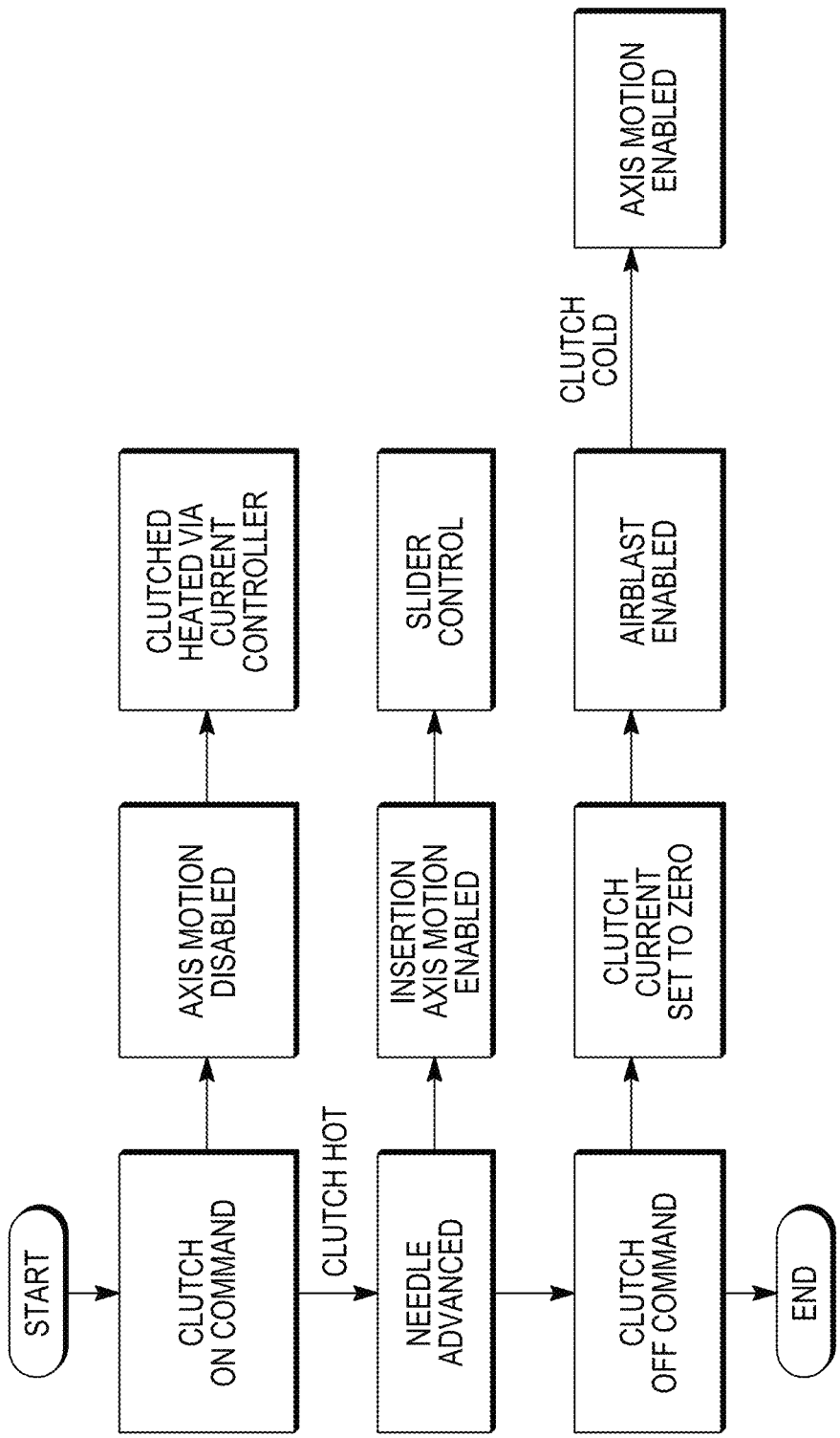
FIG. 16 shows a workflow using both needle grippers for long travel needle insertion.
Figure 17:
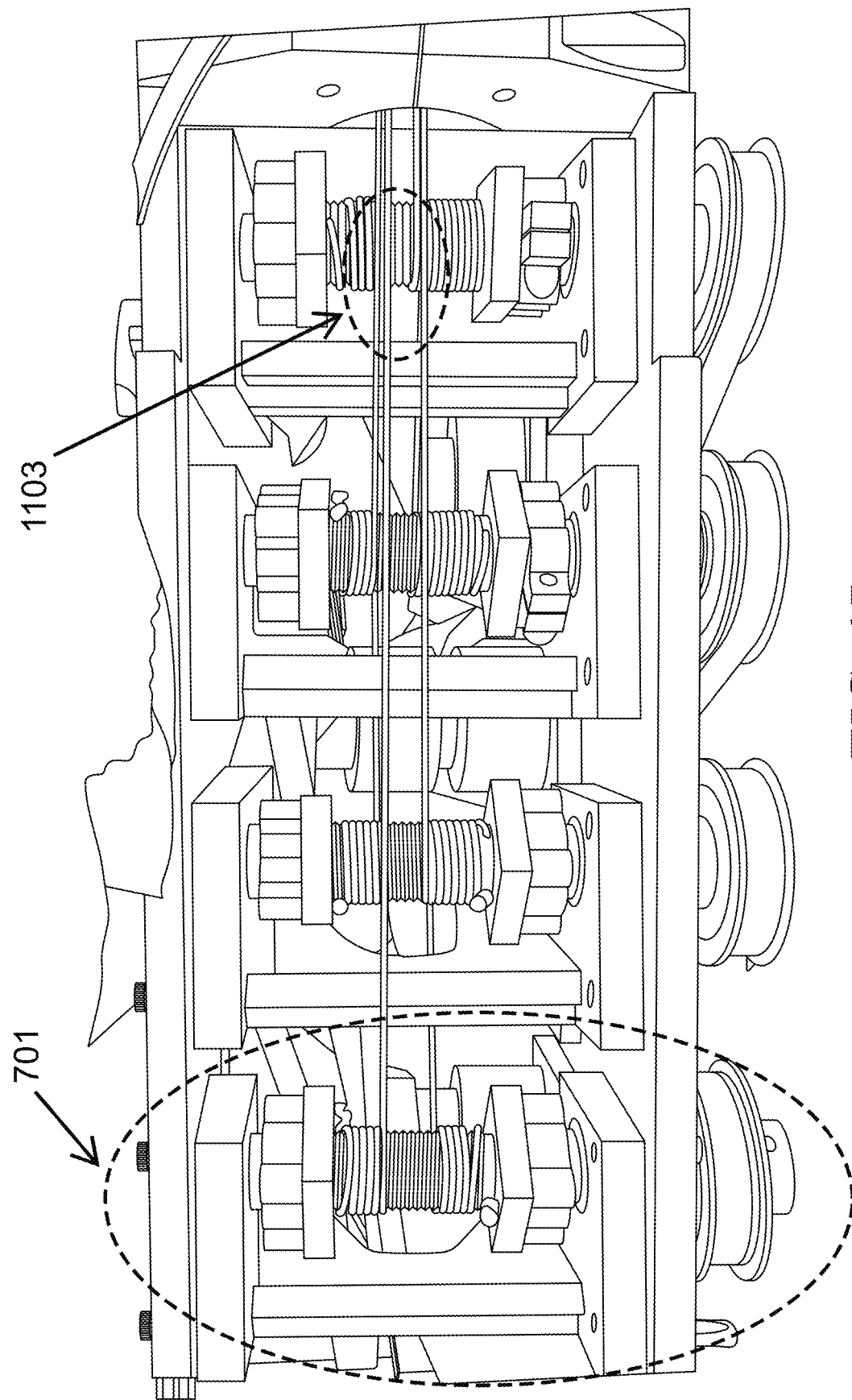
FIG. 17 shows another view of the drive module arrangement showing the joint cables.
Figure 18:
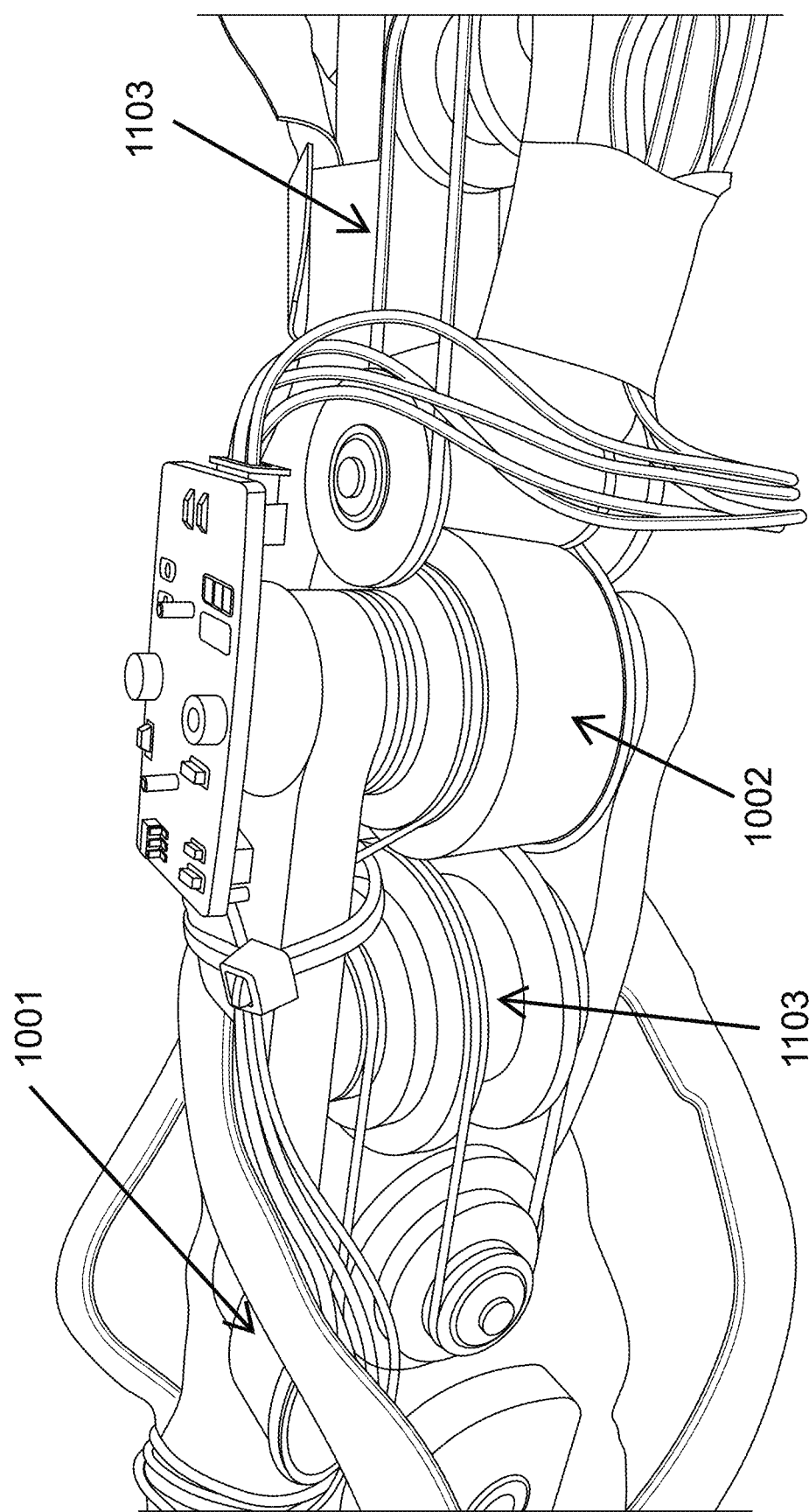
FIGS. 18 and 19 show alternative views of the fine motion joints showing the joint cables.
Figure 19:
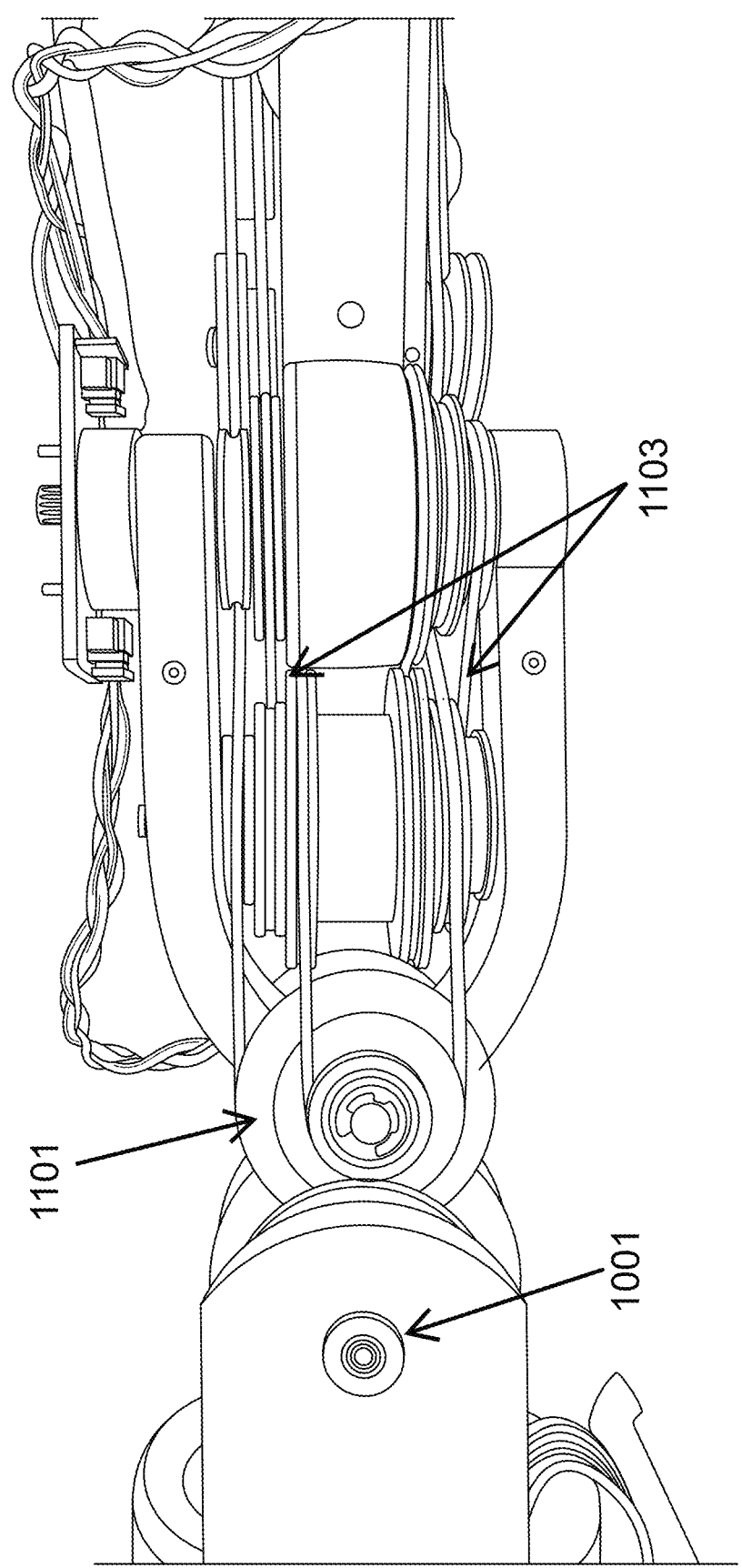

An example workflow using both needle grippers for long travel needle insertion is illustrated in FIG. 16. The needle insertion mechanism 901 has a prismatic cable driven axis for needle insertion. Mounted to this link is a needle gripper, described below. Mounted to the previous link is another needle gripper that functions can as a brake. This allows the device to incrementally insert the needle stepwise, much like a human, and achieve deep needle insertions with a minimal length needle insertion joint. This can be performed by first activating the moving needle gripper 1303, operably coupling the needle 903 to the needle insertion joint 1004. Then, the needle insertion joint can be can be advanced or retracted moving the needle. If longer travels are needed than the joint range, the stationary needle gripper 1304 can be activated and the moving needle gripper can be released. Then, the moving needle gripper's position can be moved to prepare it to perform further needle advancement. The stationary needle gripper stabilizes the needle during the moving needle gripper's motion and absorbs any forces or moments induced to the needle by the motion of the moving needle gripper while deactivated. Finally, the moving needle gripper can be activated and the stationary needle gripper can be deactivated. This process can be repeated as required. Additionally, the grippers can be de-activated and serve as a passive guide for manual physician-controlled needle insertion. Additionally both needle grippers can be attached to active joints.

Joint encoders 1102, shown in FIGS. 11, 18, 19, and 20, can provide direct measurement of the fine motion joints and needle insertion mechanism's state. Additionally, the needle insertion mechanism 902 may include a tip tracking sensor mount 1301 (shown in FIGS. 11, 13 14, 20, 21) and tip tracking sensor 1104 (shown in FIGS. 11, 20, and 21) to provide redundant direct high-rate measurement of the needle guide 1302. Direct tip position and orientation sensing for the robot's end-effector's tip near the needle insertion point on the human is achieved via a magnetic tracker. Tracking performed as close to the tip of the robot and needle as possible to minimize errors from small sensing errors of the sensor and projection further linearly causing position errors based on small orientation errors.

In some embodiments the surgical robot may be constructed from carbon fiber reinforced plastic (CFRP) to minimize link deflection and artifacts in the scanner images. Synthetic cables can also be used to minimize artifactings. End-effector sensing can be used to compensate for link deflection, which the joint level controllers do not compensate for. The cables can stretch due to external forces and internal non-idealities, including friction, creep, and hysteresis.

Electrical and Embedded Systems

The electrical components in the surgical robotic platform may include devices for tracking the system state, including position (e.g., rotary and linear encoders, resolvers, tachometers, etc.) and force sensors (e.g., strain gauge, optical, encoder based series elastic, etc.), as well as interaction between the user and the device's software components (e.g., LCD display, keyboard, mouse, etc.).

Figure 22:
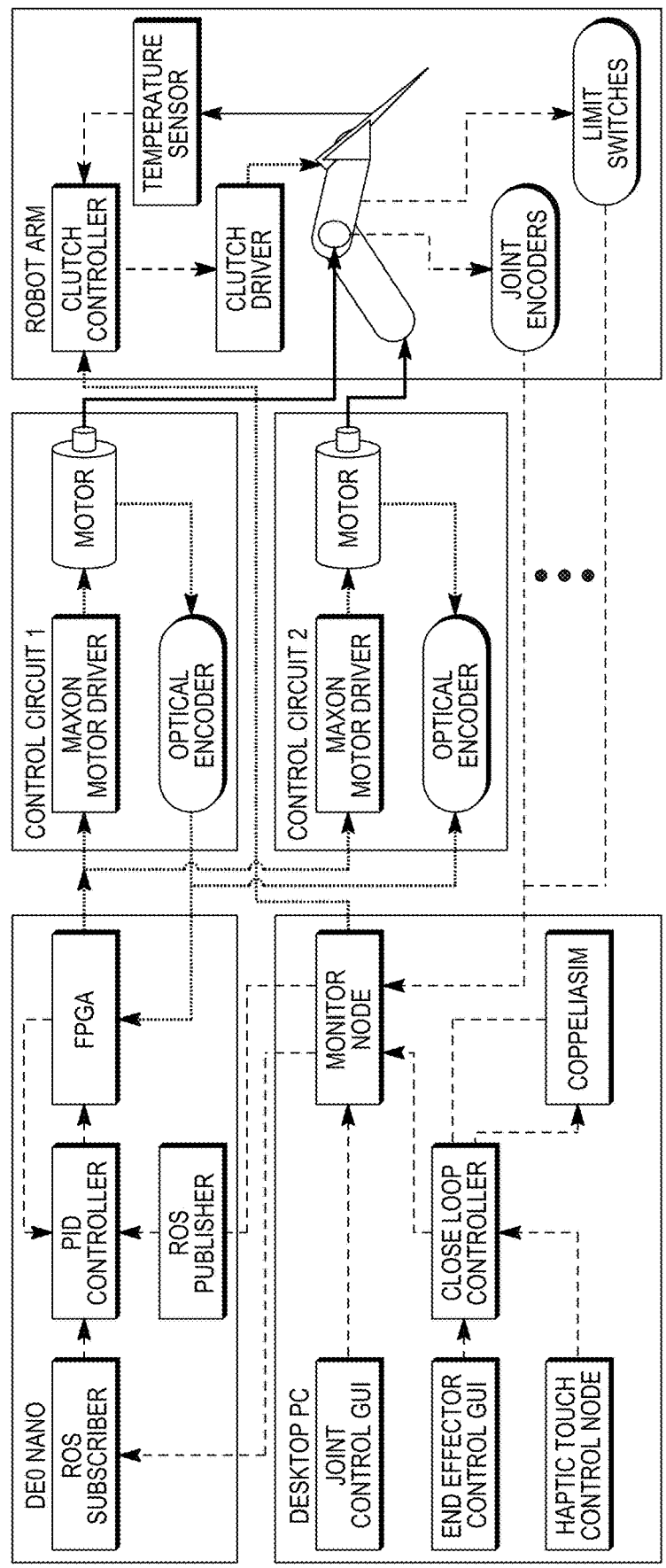
FIG. 22 shows a schematic block diagram of one embodiment of the overall system architecture for the surgical robotic platform.

The electrical system architecture may emphasize safety and extensibility. For instance, real-time embedded electronics (FPGAs and microcontrollers) may be used, which run high frequency and jitter-sensitive control, allowing for independent development and upgrade of the high-level control system. UDP with a dedicated network switch provides an extensible interface between components. The electrical system architecture may be divided into three electronic subsystems: motor control, joint sensing, and clutch thermal control These components interface with the primary control computer, which performs high-level system coordination and user interface. The centralized motor control motherboard, system power supplies, a network switch, and external interfaces, including such things as emergency stop, power switch, AC input, and RJ-45 ethernet connection can be included. Also provided may be watchdog timers and error detection algorithms implemented on the FPGA subsystem with automatic power-cut in the case of significant tracking errors or low update rates due to disconnect from the primary control computer. When combined with the mechanical safeties, this can make the system fail-passive. Redundant position sensors, including magnetic joint encoders and limit switches, can be located on all axis and connected to the primary control computer. A microprocessor-based controller can be used to manage the needle clutches. An example system architecture is illustrated in FIG. 22.

Software Architecture and User Interface

Those of ordinary skill in the art will recognize that the software system architecture may follows standard robotics design practices. The software components may have low-level software components to provide a method of interfacing and controlling the different components. The high-level software components provide user interaction and automation to the system.

The robot operating system (ROS) may form the basis for the high-level software and provides a standard messaging system. High level control software including robot kinematics and planning, image guidance, and user interaction, runs on a desktop on the ROS framework. Realtime jitter-sensitive and high-frequency components run on the embedded subsystems described previously. Each system component runs in an independent process, illustrated in FIG. 22.

In some embodiments the user interface may provide multiple options, allowing the physician to select their preferred method of device interaction. Control methods range from full automation given their target needle insertion pose to fully manual control, where they manipulate the robot's joints themselves and use the device solely for tracking. The primary interface includes a graphical user interface (GUI,) which handles system initialization and setup, direct joint level control, end-effector control, and automated setup level control incorporating path planning, which will be described below. An example system architecture is illustrated in FIG. 22. Additionally, a haptic device may be used for input to the system to device the target medical instrument insertion pose. The haptic device can be used passively as an input device or additionally reflect forces to the user. The GUI can visually display the robot motion or planned robot motion to the user.

Clinical Workflow with Surgical Robot Platform

Figure 23:
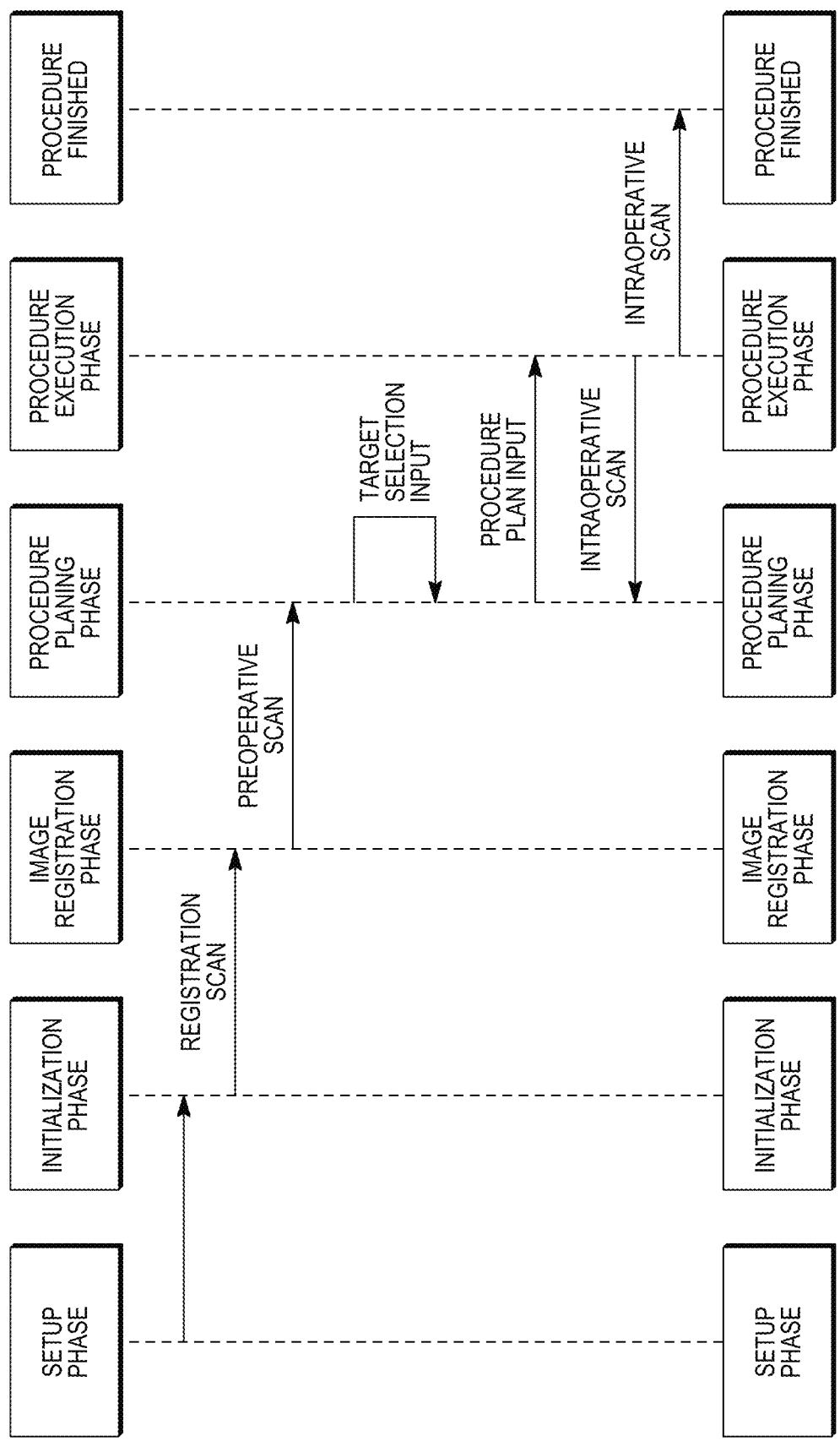
FIG. 23 shows one example of the overall workflow that may be executed when using the surgical robotic platform.

Our system's clinical workflow consists of multiple phases, visually illustrated in FIG. 23. This workflow is an extension of the image guided percutaneous surgical procedure workflow mentioned above including additional phases. A manual image-guided percutaneous surgical procedure has three main phases: Pre-operative Setup Phase, Procedure Planning Phase, and Procedure Execution Phase. For the robotic procedure, the Pre-operative Setup Phase is split into several phases: the Setup Phase, Initialization Phase, and Image Registration Phase. The Procedure Planning Phase includes several additional considerations for planning with a robot.

1. Setup Phase—the device is brought into the room and placed in position for surgery
2. Initialization Phase—the device is powered on, homed, and set to position for CT scanner calibration 3. Image Registration Phase—CT scan is performed to be used for the robot to scanner calibration.
    a. A CT scan of the robot's calibration marker is performed. The calibration marker provides a reference between the robot's coordinate frame and the CT scanner's image frame. This marker can be mounted to the robot (e.g., robot tip, robot base 404) or be disconnected. The marker may be built of a CT visible material with high contrast to the surrounding environment. For example, a high density "bright" polymer is encased by a low density "dark" polymer with a retroreflective surface which enables good visibility to both a camera system and the CT scanner.
    b. The CT scan is imported to robot software
    c. A rigid body transform between the robot coordinate system and CT scanner coordinate system is calculated using the scan data. This can be at a single nominal configuration where the robot is setup to reach into the bore and minimize imaging artifacts.
4. Procedure Planning Phase—the user determines a medical instrument insertion point and orientation, called the Target Medical Instrument Insertion Pose 2901 within the robot software.
    a. Patient is situated on the scanner and prepared for the procedure
    b. Physician/CT technician takes a preoperative image of the relevant region of the patient's anatomy. This provides an up-to-date image of the patient for procedure planning
    c. CT scan is imported to robot software
    d. Physician selects input method for the robot software based on their preference. This could be a touchscreen or mouse to interact with an on-screen Graphical User Interface or more natural physical input such as a 6D mouse or a needle-like device which is tracked in free space.
    e. Physician explores CT scans in preferred visualization to determine needle insertion point and orientation in the imaging reference frame. This can be via 2D planar slices (e.g., axial, sagittal, coronal, multiplanar reformats, etc.) or in 3D.
    f. Physician selects robot planning method: Automated Robot Trajectory Planning and Control, teleoperated, direct joint control, or manual positioning with tracking which provides various levels of assistance to the physician during the insertion. The system is deactivated and used solely for needle state tracking in passive mode. In joint control mode, the physician directly commands the joints and functions similarly to a stereotactic frame with remote control. End-effector inverse kinematics control in the image frame is the standard model for most image-guided robots. Here, the physician determines how they would like the end-effector to move, and the system's control algorithm determines how to move the joints. However, the physician is responsible for observing the system and confirming the planned motion is safe and will not hit other environment components such as the patient or scanner bore. Confirmation is asked for motions before execution but can be disabled by the user. In the Automated Robot Trajectory Planning and Control method, the system determines a dexterous and safe nominal robot configuration that achieves the physician-specified insertion pose and a safe trajectory from where the robot is. We provide more details in the section titled Automated Robot Trajectory Planning and Control.

5. Procedure Execution Phase—insert the needle-like tool into the patient and ultimately reach the target point within their body. This begins the closed-loop needle insertion method. Details of phase:
   a. Physician authorizes/selects trajectory/configuration to be executed
   b. If not yet mounted, the needle is mounted to the robot
   c. Robot executes path plan
   d. Physician takes an intraoperative CT scan and determines if the medical instrument has reached the target location.
      i. If the target is not satisfactorily reached, the physician will loop back to Procedure Planning Phase and iterate.
      ii. If the physician is satisfied with targeting accuracy/target is reached within the patient, and the Procedure is Finished. This may be the end of the procedure or the start of a new needle insertion if multiple needles need to be inserted.

Automated Robot Trajectory Planning Method

As discussed above, surgical robot setup in the operating room in preparation for surgery is challenging due to the numerous considerations required clinically. For all surgical guidance (e.g., active robotics platforms, passive setup joints), setup can be time-consuming and difficult, frequently requiring reset up if joint limits are reached or environmental collisions occur. Ideally the device must be positioned such that it can move as needed to perform the procedure without colliding with itself or other items within the surgical field most importantly the patient. In our specific environment of in-bore needle manipulation, the space is highly limited by both the scanner bore 2501 and the patient 2502. Simply put, the device must avoid the scanner bore on top of typical obstacles. We present a method to address these challenges in how to set up the robot within the scanner such that the medical instrument can be inserted and manipulated within the bore without collision. This planning method diverts the cognitive load from the physician operating the device to the device, decrease required the time for surgical planning, and enable the more widespread use of robotics within imaging bores.

Figure 25:
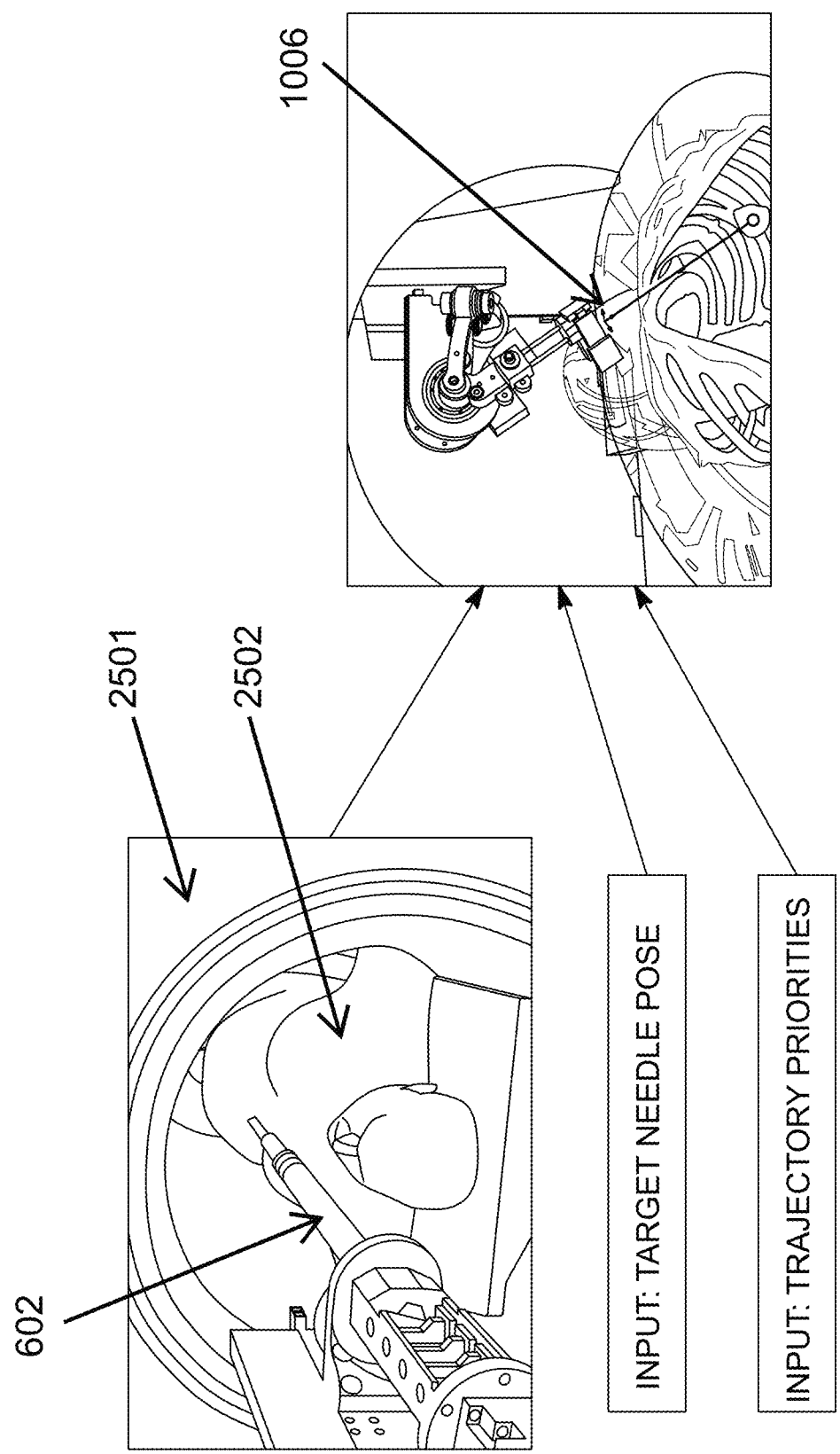
FIG. 25 illustrates the method for planning the automated robot trajectory.

Here we present an implementation of the Automated Robot Trajectory Planning and Control method introduced above. This method determines a collision-free trajectory for a robot, enabling the robot to manipulate a medical instrument safely and dexterously within an imaging bore. Illustrated in FIG. 25, the method uses the Target Medical Instrument Insertion Pose, Trajectory Priorities, and the Virtual Environment as inputs, and then the method calculates an Optimized Robot Trajectory from the Current Configuration to the Target Medical Instrument Insertion Pose. In the following sections, we define these terms and the method in more detail.

Homogeneous transforms are used for all coordinate system transforms. Unless otherwise specified, all poses are relative to the base frame of the robot and in the base frame's coordinate system.

Figure 13:
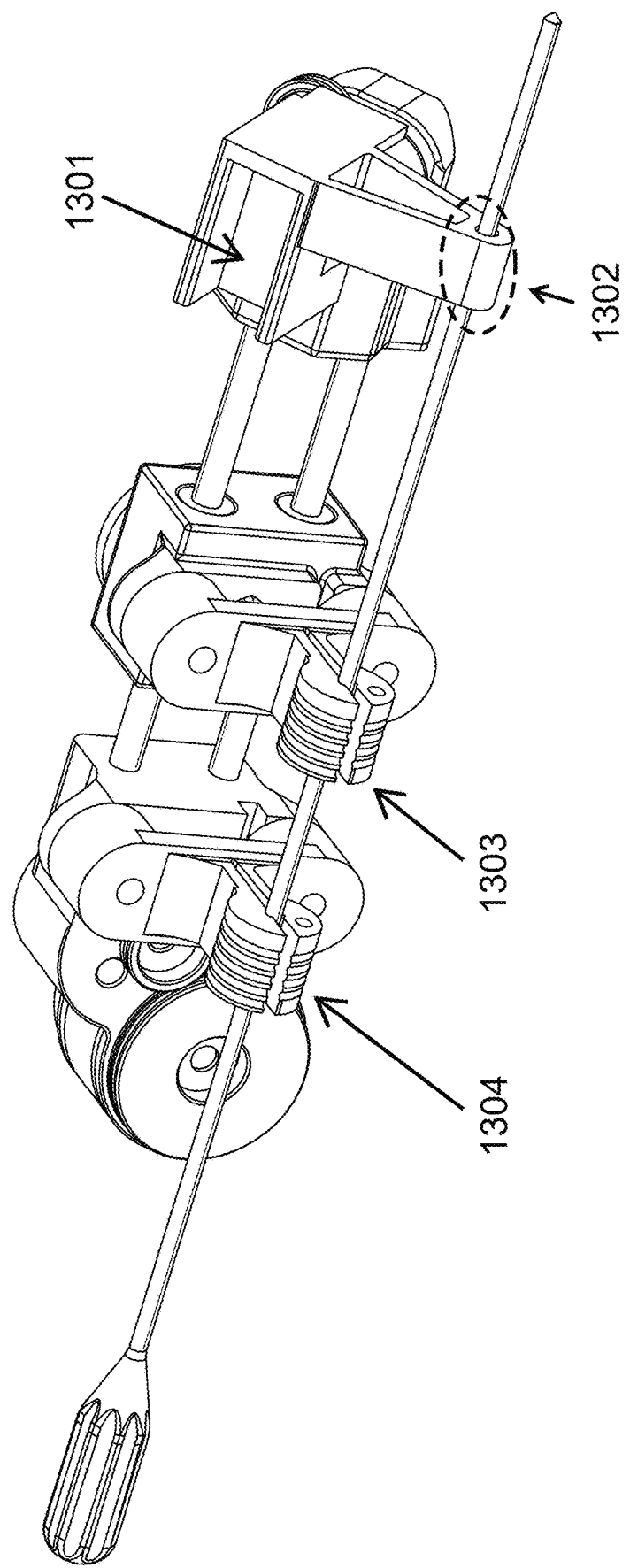
FIGS. 13-14 show additional details of the needle insertion mechanism employed in the joint arrangement.
Figure 14:
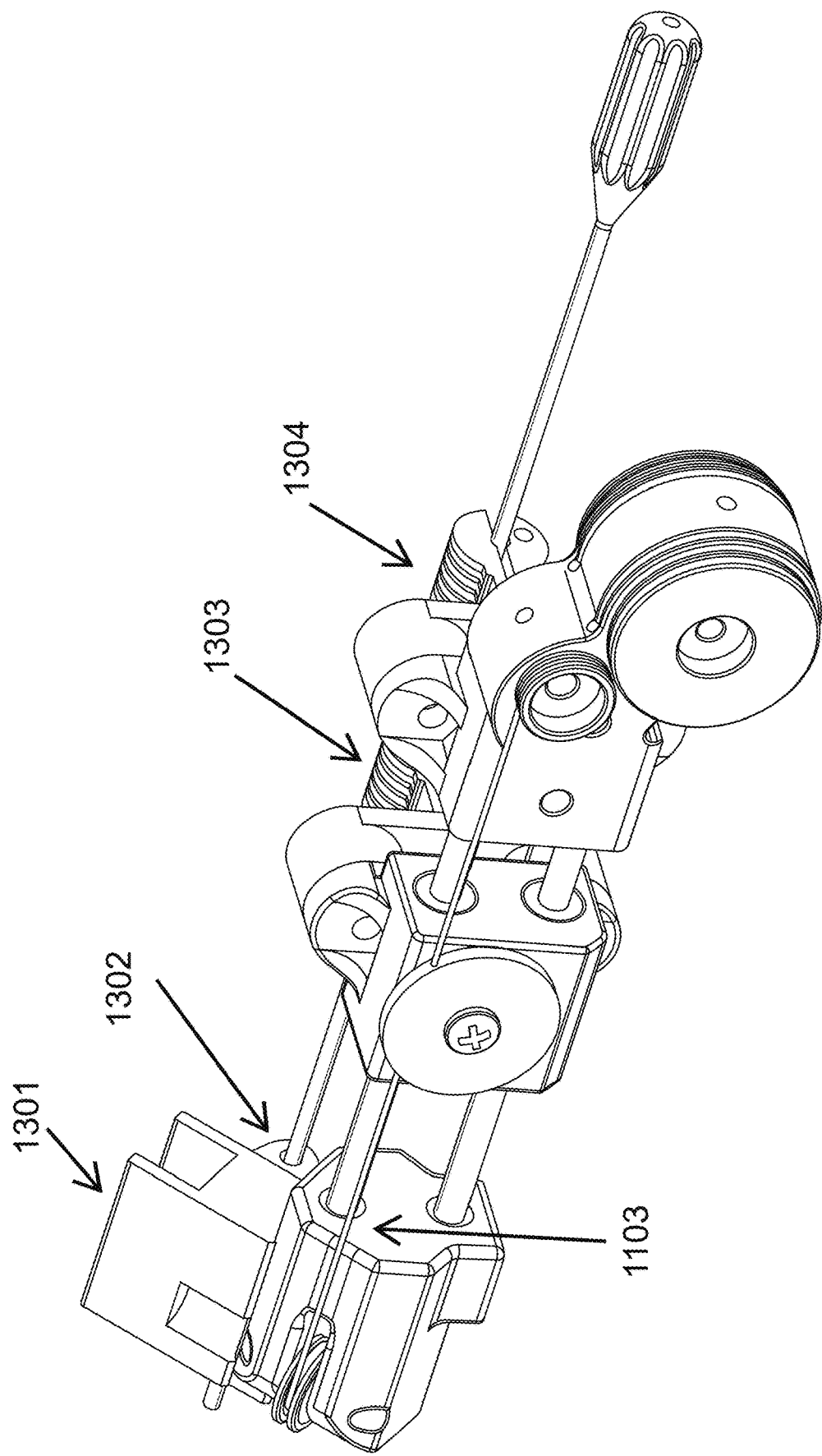

The Needle Insertion Mechanism Tip Pose 1005, shown in FIG. 10, is a coordinate frame attached to the Needle Guide of the Needle Insertion Mechanism, shown in FIGS. 13 and 14. The Z-axis of the Medical Instrument Insertion Pose 1006 is parallel with the coaxial longitudinal axis of the needle and goes towards the patient. The X-axis and Y-axis of this frame are arbitrarily defined as perpendicular to the Z-axis due to our symmetric needle assumption and error function which neglect these two axes.

The Medical Instrument Insertion Pose 1006 also shares an orientation with the Needle Insertion Mechanism Tip Pose 1005 however, this new frame is redefined at each step to co-inside with the outermost contact point on the needle/robot in contact with the patient (the insertion point). These poses are represented in the base frame of the robot and are rigidly attached to the robot. This is shown in FIG. 10.

The Target Medical Instrument Insertion Pose 2901 is the position and orientation specified as an input to the algorithm for insertion into the patient 2502. This can be input by the user directly or by another system.

Figure 28:
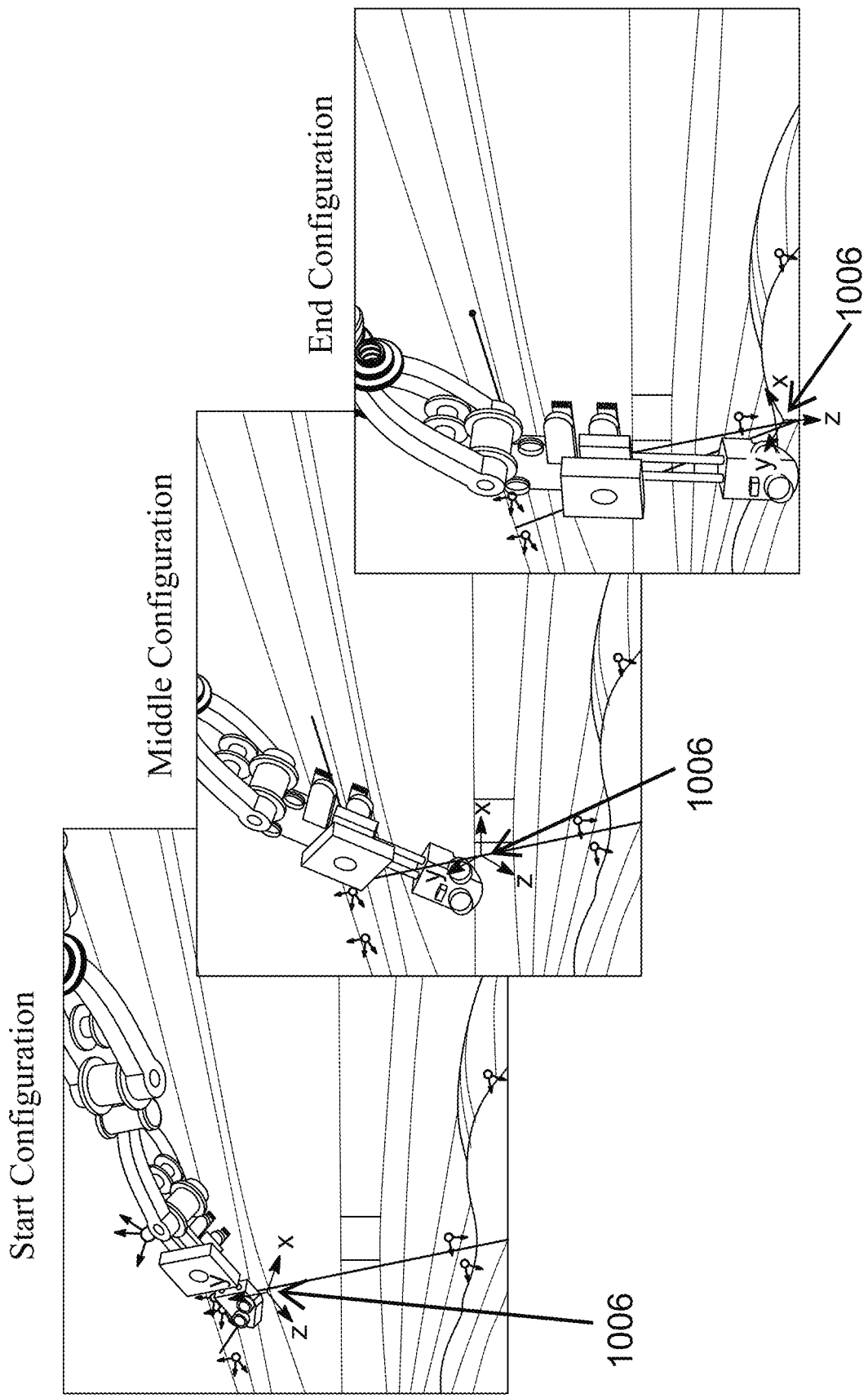
FIG. 28 shows an example of the robot trajectory.
Figure 29A:
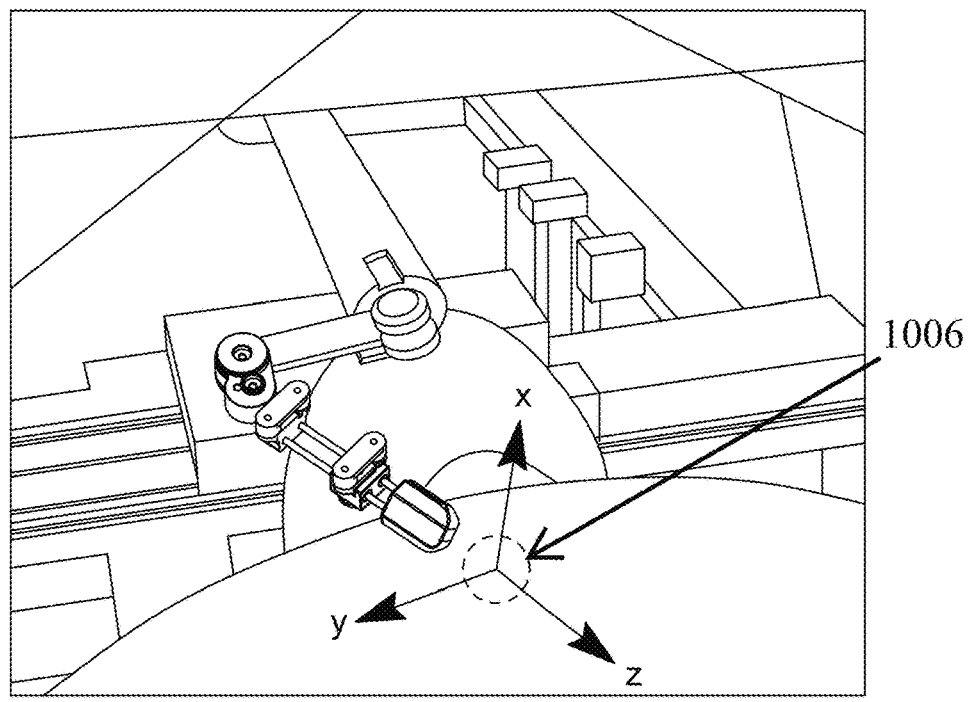
FIG. 29a and FIG. 29b shows an example of the robot trajectory in a roll axis.
Figure 29B:
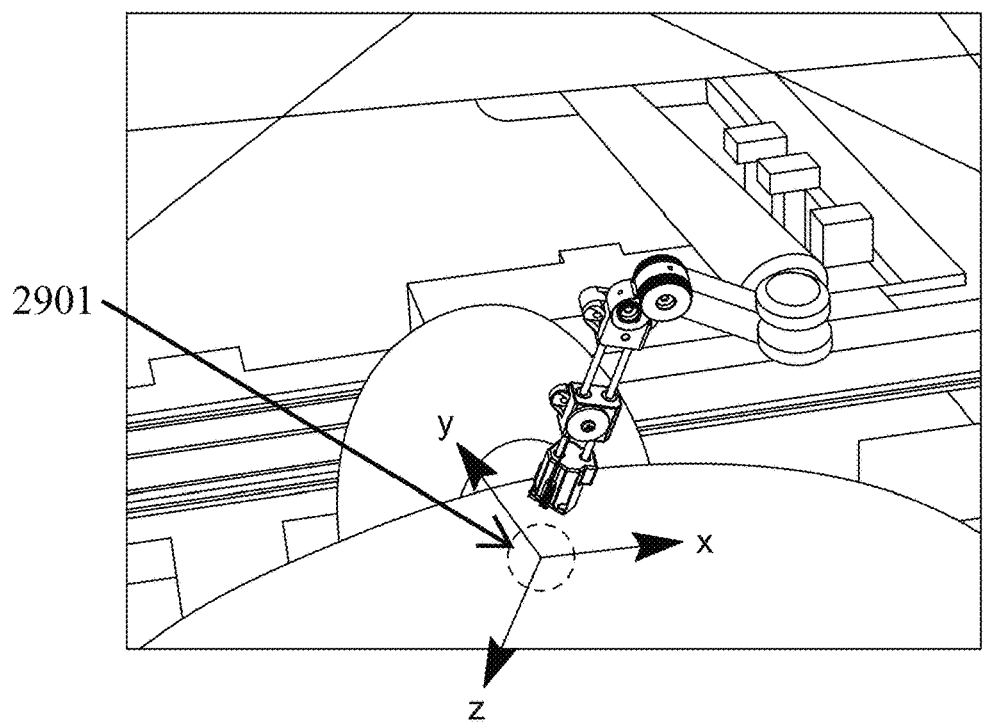
Figure 30:
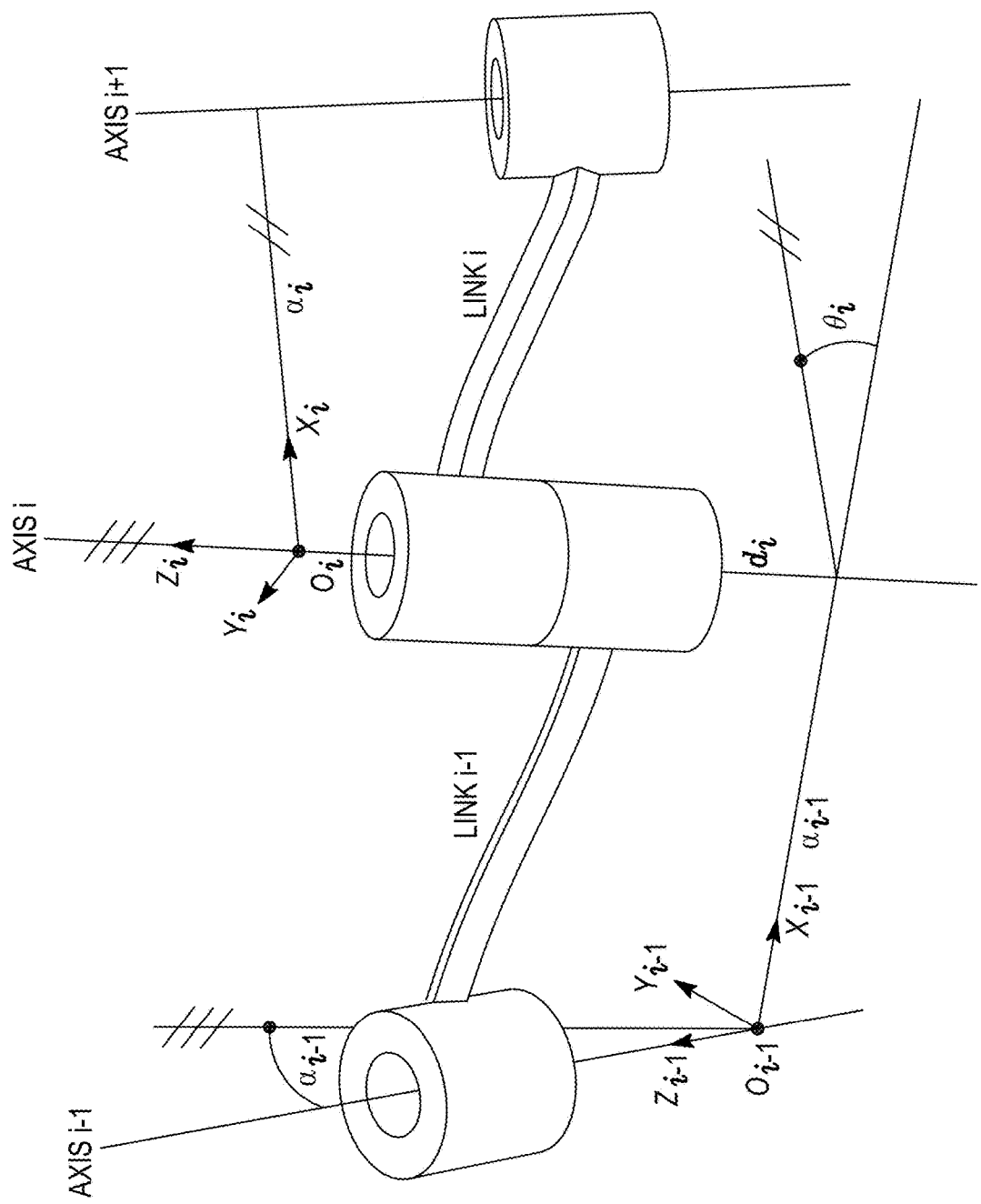
FIG. 30 shows an illustration of the coordinate frames used in the DH parameter convention for kinematics.
Figure 31A:
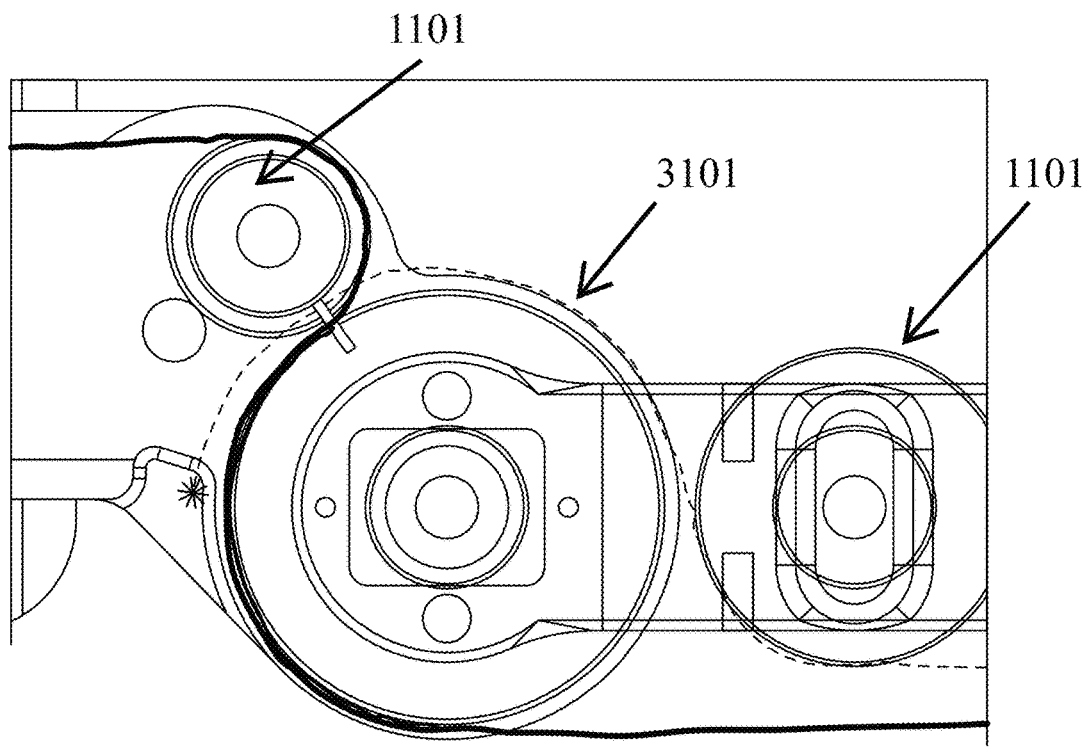
FIG. 31a and FIG. 31b shows the actuator and join space coupling for the end-effector.
Figure 31B:
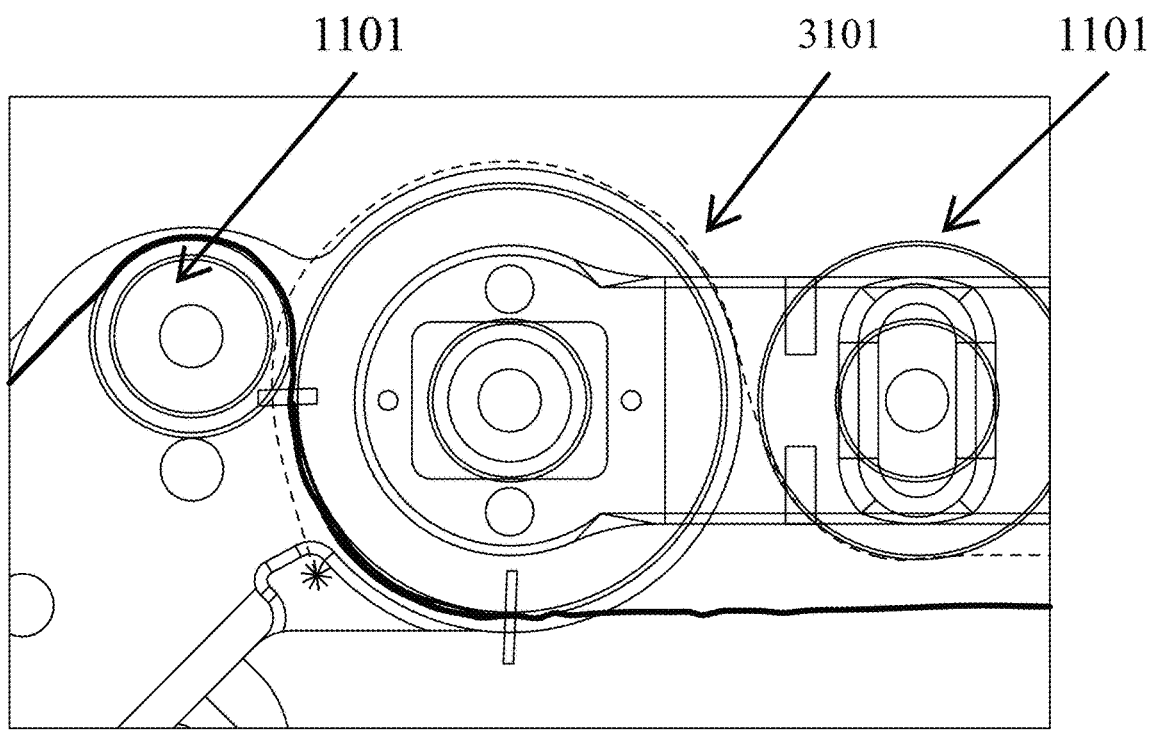

An example of a trajectory generated by the Automated Robot Trajectory Planning and Control method is shown in FIG. 28. In this figure, the start configuration is the initial set of joint positions for the robot, the robot passes through many intermediate configurations represented as middle configuration but is not limited to a single configuration. The trajectory concludes at the end configuration where the Medical Instrument Insertion Pose 1006 aligns with the Target Medical Instrument Insertion Pose 2901 within a tolerance.

Figure 26B:
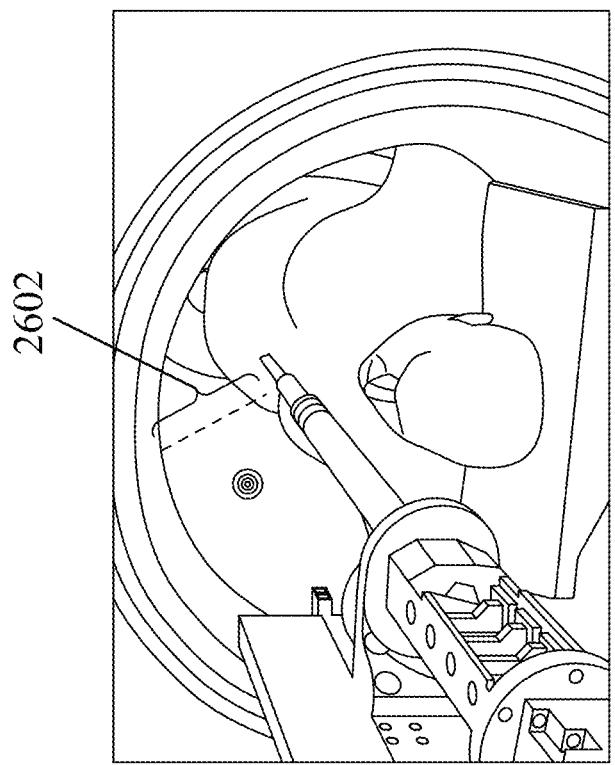
FIG. 26 shows images illustrating metrics that may be used to optimize the robot configuration.

The Virtual Environment, illustrated in FIG. 26, provides a method of simulating the robot, the scanner, and the patient 2502. The Virtual Environment provides methods to determine the distance-to-collision measurement between rigid bodies. This simulation environment is implemented using standard robotics techniques. The collision objects within the Virtual Environment are created using standard robotics methods for 3D capture. This data includes point clouds and voxel data from 3D scans (e.g., LIDAR, RGB-D, Medical Imager Volumes).

Figure 24C:
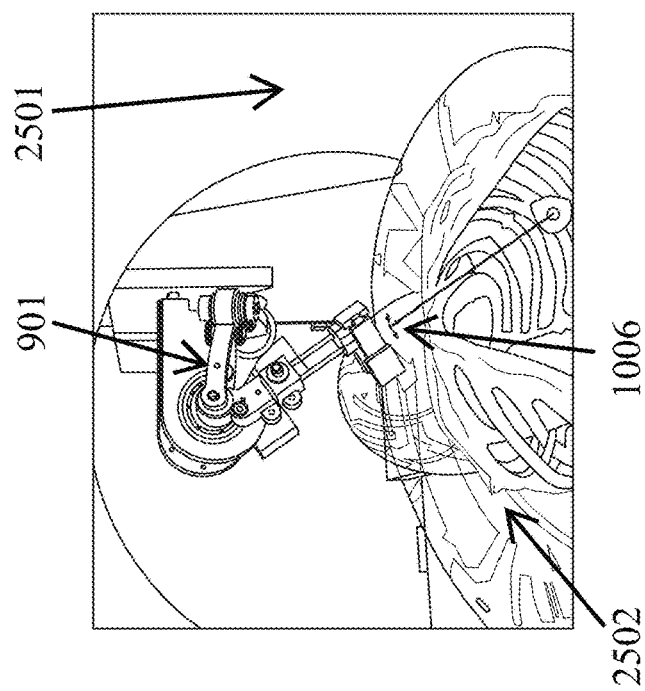
FIG. 24 shows images of the medical image scan and the robot environment.
Figure 24B:
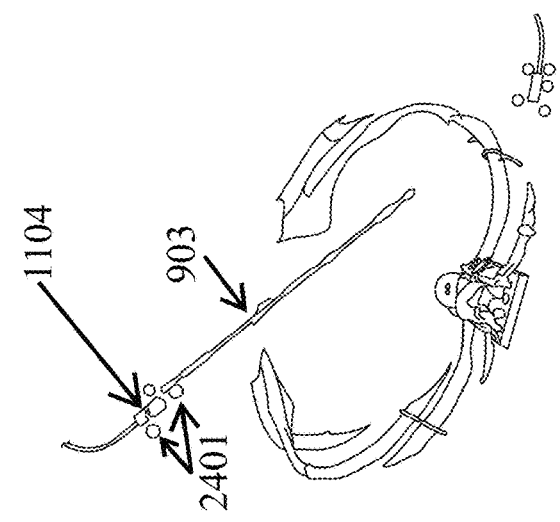
Figure 24A:
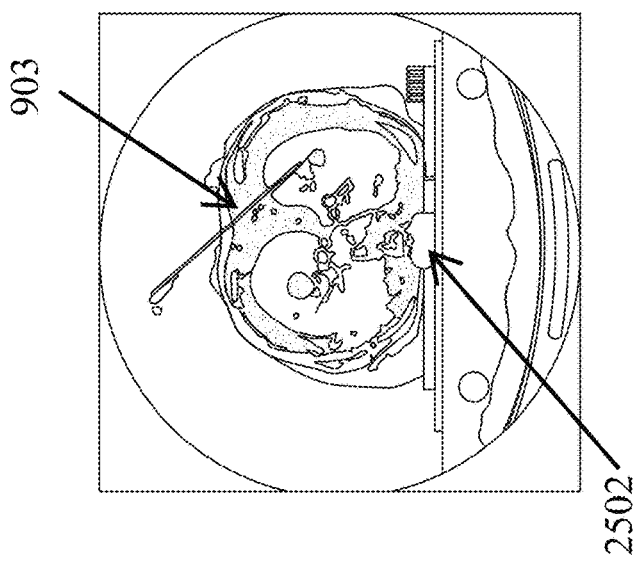

The robot to scanner alignment method is performed at the initialization of the procedure and provides a rigid body transform between the robot base and the CT scanner to Robot Base Transform, $^{base}T_{scanner}^{base}$. The robot to scanner alignment method is determined from a scan marker whose pose is known within the robot frame and can uniquely be determined with the Medical Image. Here, the scan marker 2401 consists of CT visible marker spheres embedded in a polymer housing, shown in FIG. 24.

The robot's kinematics chain is described using the Modified Denavit-Hartenberg (DH) parameter convention, shown below. $^{A}T_{B}^{C}$ describes a 4×4 homogenous transform $\in SE(3)$ from coordinate from A to coordinate frame B relative to base frame C.

| Frame | Type | a (meters) | α (rad) | D (meters) | θ (rad) |
|---|---|---|---|---|---|
| 1 | p | 0 | $-\frac{\pi}{2}$ | $q_1$ | 0 |
| 2 | p | 0 | $-\frac{\pi}{2}$ | $q_2$ | $-\frac{\pi}{2}$ |
| 3 | p | 0 | $-\frac{\pi}{2}$ | $q_3$ | $-\frac{\pi}{2}$ |
| 4 | r | 0 | 0 | 0 | $q_4$ |
| 5 | r | 0 | $\frac{\pi}{2}$ | 0 | $q_5 + \frac{\pi}{2}$ |
| 6 | r | 7e−2 | $\frac{\pi}{2}$ | 0 | $q_6$ |
| 7 | r | 7e−2 | $\frac{\pi}{2}$ | 3e−2 | $q_7 - \frac{\pi}{2}$ |
| 8 | p | 1e−2 | $-\frac{\pi}{2}$ | $q_8$ | 0 |
| 9 | — | 0 | 0 | 6e−2 | $\frac{\pi}{2}$ |

The DH parameters define the position of the next frame relative to the previous frame as $c_{n+1} = c_n + a\, x_n + D\, z_{n+1}$ and orientation relative to the previous frame as $$R_{n+1} = R_n \begin{bmatrix} 1 & 0 & 0 \\ 0 & \cos\alpha & -\sin\alpha \\ 0 & \sin\alpha & \cos\alpha \end{bmatrix} \begin{bmatrix} \cos\theta & -\sin\theta & 0 \\ \sin\theta & \cos\theta & 0 \\ 0 & 0 & 1 \end{bmatrix}$$

where $R_n$ is the orientation and $c_n$ is the position of the nth frame relative to the robot's base frame, B, and $q_n$ is the position of the nth joint. For this robot with 8 revolute and prismatic axes, $n \in \{1, \ldots, 9\}$ with n=1 as the robot's base frame and n=9 as the robot's end-effector frame. The robot base to Medical Instrument Insertion Pose transform, is defined as $$^B T_{Tmiip}{}^B = fk(q) \text{ for } q \in \mathbb{R}_8,$$

where q are the robot's joint positions, $fk(q)$ is defined by chaining together the link transforms described by the DH convention, B is the robot base coordinate frame and the default coordinate frame for transforms if unlisted.

Formal Trajectory Generation Problem definition

Here we provide a formal definition and implementation details of the Automated Robot Trajectory Planning Method. The joint configuration space is defined as $Q \subset \mathbb{R}^d$ and the workspace is represented by $X \subset SE(3)$. The function $fk: Q \to X$ translates between the joint configuration space and the Medical Instrument Insertion Pose in the workspace. Let $Q_{free} \subset Q$ be the collision-free joint configuration space. Collision-free means that the fine motion joints are not in contact with the scanner and the person. We assume the provided Target Medical Instrument Insertion Pose 2901 is within the workspace. If the Target Medical Instrument Insertion is outside the workspace, the method will fail and return to the user that the specified Target Medical Instrument Insertion is outside the workspace.

$$Q_{feasible} = Q_{free} \cap Q_{dextereous} \cap Q_{adjustable} \text{ where } Q_{dextereous} =$$

Given a starting joint configuration, $q_{start} \in Q_{free}$, and a Target Medical Instrument Insertion Pose, $x_{goal} \in X_{free}$, where $X_{free} = \{x | x = fk(q) \forall q \in Q_{free}\}$, the objective is to generate a sequence of joint configurations, also called a trajectory, $q\{q_{start}, q_1, q_2, \ldots, q_n\}$s, t, $q_n \in Q_{goal}$ where $Q_{goal} = \{q | \|fk(q) - x_{goal}\|_2 \le \epsilon\}$. $q_i \in Q_{free} \forall i \in \{1, \ldots n\}$ and $q_n \in Q_{feasible}$.

Figure 26A:
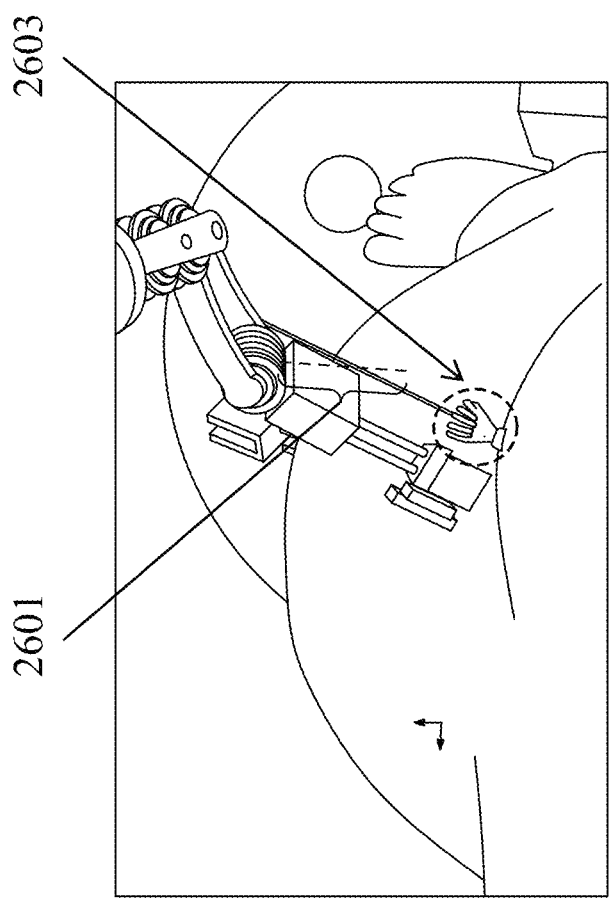
Figure 27B:
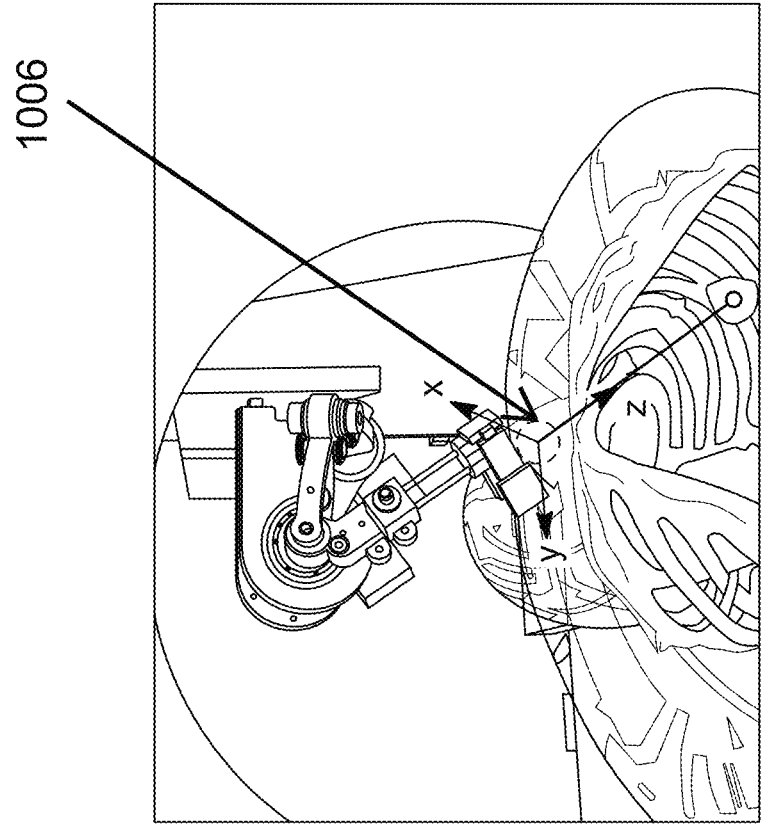
FIG. 27a and FIG. 27b show joint configurations for a medical instrument insertion pose based on optimization weights.
Figure 27A:
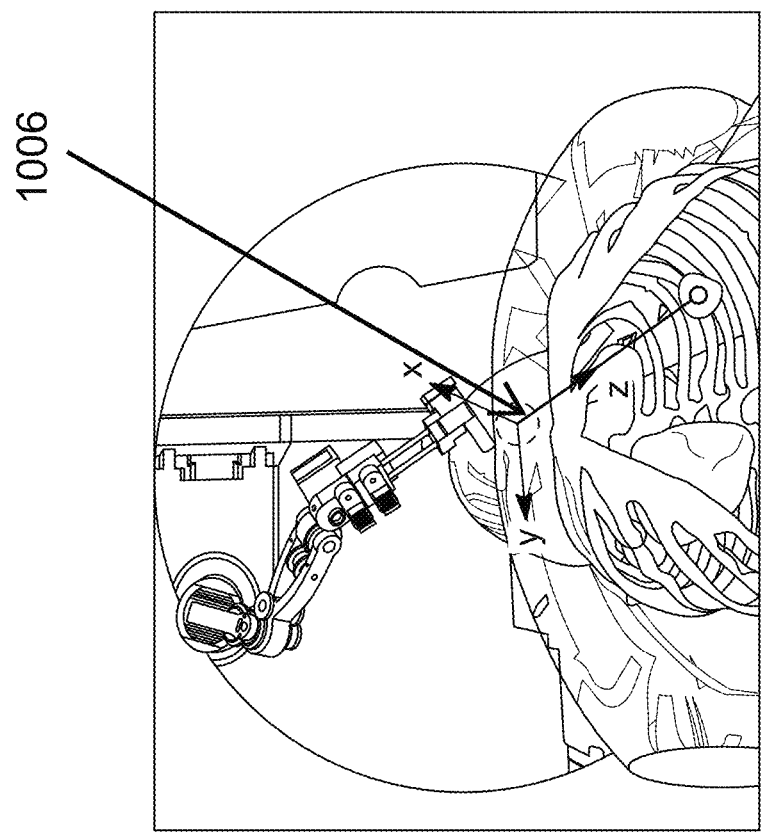

$\{q | q_{high} < q < q_{low},$ $J(q)^T F_{required} < \tau_{maximum},$ $J(q)^T v_{required} < q_{maximum}\}$ and where $Q_{adjustable} = \{q | fk(q) + \Delta x \in X_{free} \; \forall \Delta x < \Delta x_{input}\}$ where $\Delta x_{input}$ is specified as a default value based on the robot design and medical instrument used This denotes the ability to manipulate the medical instrument around the Target Medical Instrument Insertion Pose and is illustrated in FIG. 26a). During the procedure, the Medical Instrument Insertion Pose may be updated. Updates frequently are performed as rotational pivots centerered around a point along the Z-axis of the Medical Instrument Insertion Pose. This results in the robotic device functioning as a remote center of motion centered at the pivot point. The collision-free joint configuration space can be represented as a look-up table representation, allowing the rapid parallel precomputation for the planning algorithm to use during the procedure. A robot trajectory denotes a trajectory performed by a robot. This can be represented in different ways, including as a joint trajectory. A joint trajectory is a sequence of joint configurations, including joint angles and positions.

$J(q)$ is the robot Jacobian function, $F_{required} \in \mathbb{R}^6$ is a wrench represented in the robot base frame and is the required force and moment the robot must generate to insert and manipulate the Target Medical Instrument, $\tau_{maximum}$ is the robot's maximum joint torque, $v_{required}$ is a twist in the robot's base frame and the Target Medical Instrument Insertion's needed motion velocity, and $q_{maximum}$ is the robot maximum joint velocity. These Trajectory Metrics are heuristics to make sure the robot is able to follow the desired trajectory given the robot design and configuration. FIG. 26a) illustrates the metric utilized for $Q_{adjustable}$ showing nearby sampled angulation Target Medical Instrument Insertion Poses, called Needle Base orientation adjustability 2603, that should have feasible trajectories from the robot configuration, q. Additional optimality constraints can be added to q* for a given cost function c(q).

$$\text{The cost function } c(q) = \sum_{i=1}^{n} \left\| \frac{\alpha}{w(q_i)} + \beta y(q_i) + \gamma z(q_i) \right\|_2$$

where α, β, γ are the Trajectory Priorities, $w(q) = \sqrt{\det(J(q)J^T(q))}$ is manipulability measure of the configuration and large values represents configurations with high dexterity, $y(q)$ is the minimum distance-to-collision between the fine motion joints and the scanner bore 2602, and $z(q)$ is the minimum distance-to-collision between the fine motion joints and the patient 2601. FIG. 26 in both parts (a) and (b) label the distance to collision values used for this cost function.

The total problem can be modeled and solved as a multi-object least-squares optimization problem with equality and inequality constraints. We solve this problem using a hierarchical planning approach. If the Target Medical Instrument Insertion Pose 2901, $x_{goal}$ is far from the current Medical Instrument Insertion Pose, $x_{current} = fk(q)$, written as $\|x_{goal} - fk(q)\|_2 > \sigma$ where σ is the distance threshold, then use the Global Planner. Otherwise, use the Inverse Kinematics Solver. If the Inverse Kinematics Solver fails, use the Global Planner and notify the user if the Medical Instrument has already been inserted into the patient. For the initial robot setup before the Medical Instrument Insertion, default to the Global Planner. FIG. 28 illustrates a situation which runs the Global Planner due to the large distance between the Current Medical Instrument Insertion Pose and Target Medical Instrument Insertion Pose.

The Global Planner uses three optimizer approaches: a search based optimizer, a sampling based motion planning algorithm, and a gradient based optimization algorithm for Inverse Kinematics. The method called by this optimizer for the Global Planner performs the following steps: an initial robot joint configuration, $q_n$, is determined using the Inverse Kinematics Solver with multiple random initial seeds. $q_n$ is used as an initialization for robot joint configuration optimization via direct null-space search using the search based optimizer for the primary cost objective c(q). Next, a feasible trajectory to this optimal robot configuration is calculated using a sampling based motion planner (e.g., RRT*). Frequently, this approach takes longer to find an initial solution than the Inverse Kinematics Solver which is a gradient based optimization implemented as repeat calls to the End-Effector controller. In the Inverse Kinematics Solver, each joint configuration of the trajectory is created from a single call to the Medical Instrument Insertion Pose controller using the previous joint configuration as the input for the following Medical Instrument Insertion Pose controller call. Generally, the Inverse Kinematics solver finds feasible solutions for needle adjustment during the procedure as the initial robot configurations used at the start of the medical instrument insertion is dexterous and adjustable.

Joint to Actuator: State Estimation and Control

The motor and joint positions, $\theta$, $q \in \mathbb{R}^8$, are related as $$q = L\theta$$

where L is the 8×8 coupling matrix. In the case of joint mounted actuators or an uncoupled transmission, L is diagonal and corresponds to the simple gear-ratio of the transmission, as in our $q \in \{1, \ldots, 4\}$. In coupled situations, L is upper triangular. Due to manufacturing tolerances, L is constructed during a calibration step from data row-wise and calculated in a data-driven fashion as a least-squares linear-regression problem as $$L_{i,*} = q_{i,*}\theta^\dagger \text{ where } \theta^\dagger = \theta^T(\theta\theta^T)^{-1}$$

for each row i of L with $q_{i,*}$ being a time series of m samples a single joint's angle and $\theta \in \mathbb{R}^{8 \times m}$ being a time series of all motor angles being used as inputs for the coupling matrix for 8 output joints. Here, joint $q \in \{1, \ldots, 4\}$ are calibrated individually as scalar terms and $q \in \{5, \ldots, 8\}$ are calibrated together as a matrix. This matrix can be calculated analytically from the system design or empirically off observed data, but by doing it empirically, errors between ideal and actual kinematic parameters are reduced.

The estimated joint state, $q_{est}$, is constructed via a complementary filter between the motor's velocity, $\dot{\theta}$, and the magnetic joint encoders position, $q_{meas}$, as $$q_{est} = \alpha L \dot{\theta}_{meas} \Delta T + (1-\alpha) q_{meas}$$

for a sampling time, $\Delta T$, and weighting parameter, $\alpha$, corresponding to the changeover frequency of the filter between the two sensors. The complementary filter helps to reduce errors resulting from high frequency noise in magnetic joint encoder readings and the coupling matrix equation's errors due to the cable-transmission's spring-stiffness.

This joint angle estimate, $q_{est}$ is used to update the motor set-point position, $\theta_{set}$ following a PD control law in the joint space $$\theta_{set} \leftarrow \theta_{set} + \Delta\theta \text{ for } \Delta\theta = L^{-1}\left(K_p e_q + K_d \frac{de_q}{dt}\right)$$

where $e_q = q_{set} - q_{est}$, $q_{set}$ is the joint angle setpoint, and $K_p$, $K_d$ are the proportional and derivative gains.

Medical Instrument Insertion Pose Controller

Figure 33:
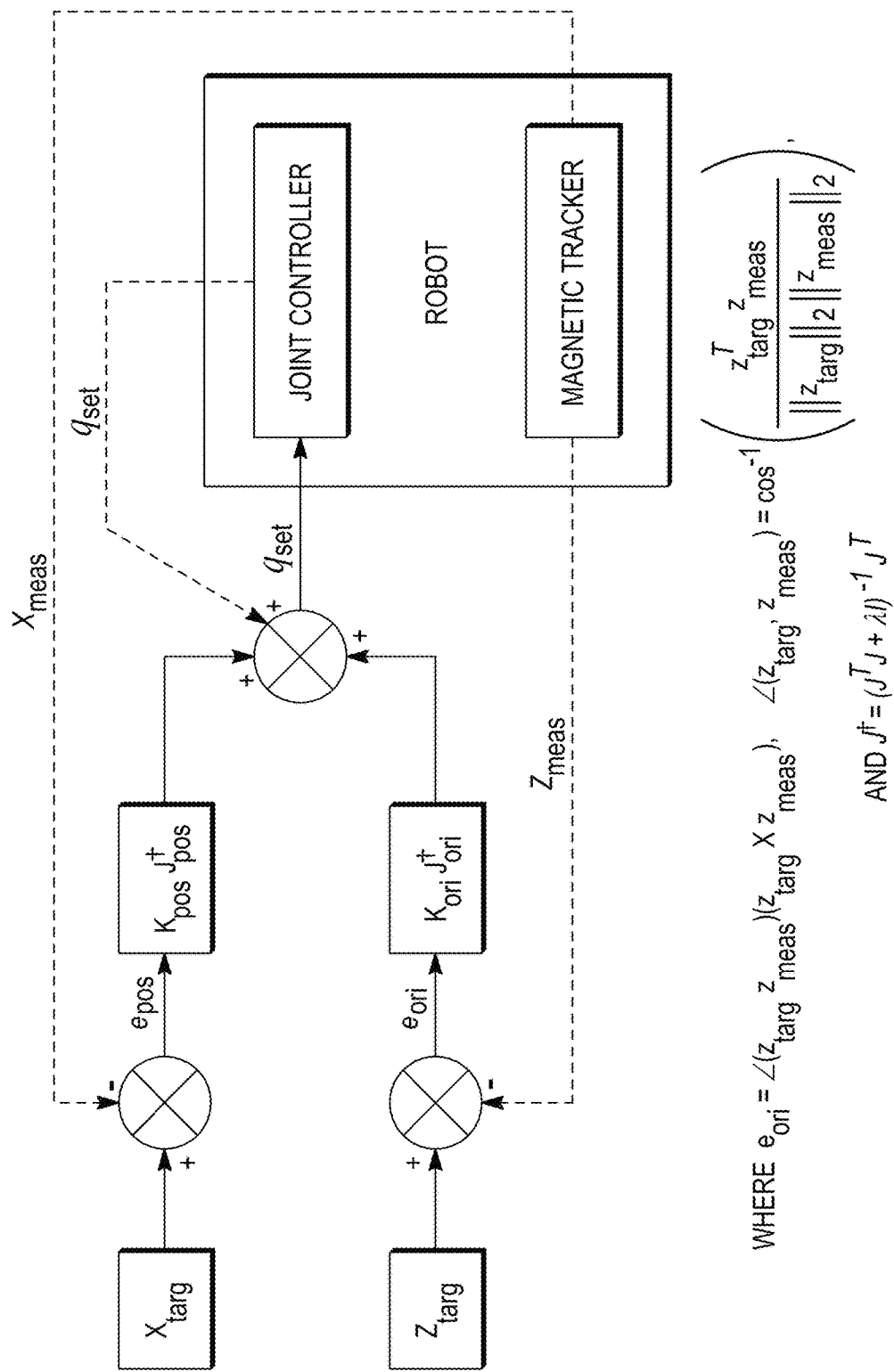
FIG. 33 shows a schematic diagram of the control process used in the end-effector controller.
Figure 34:
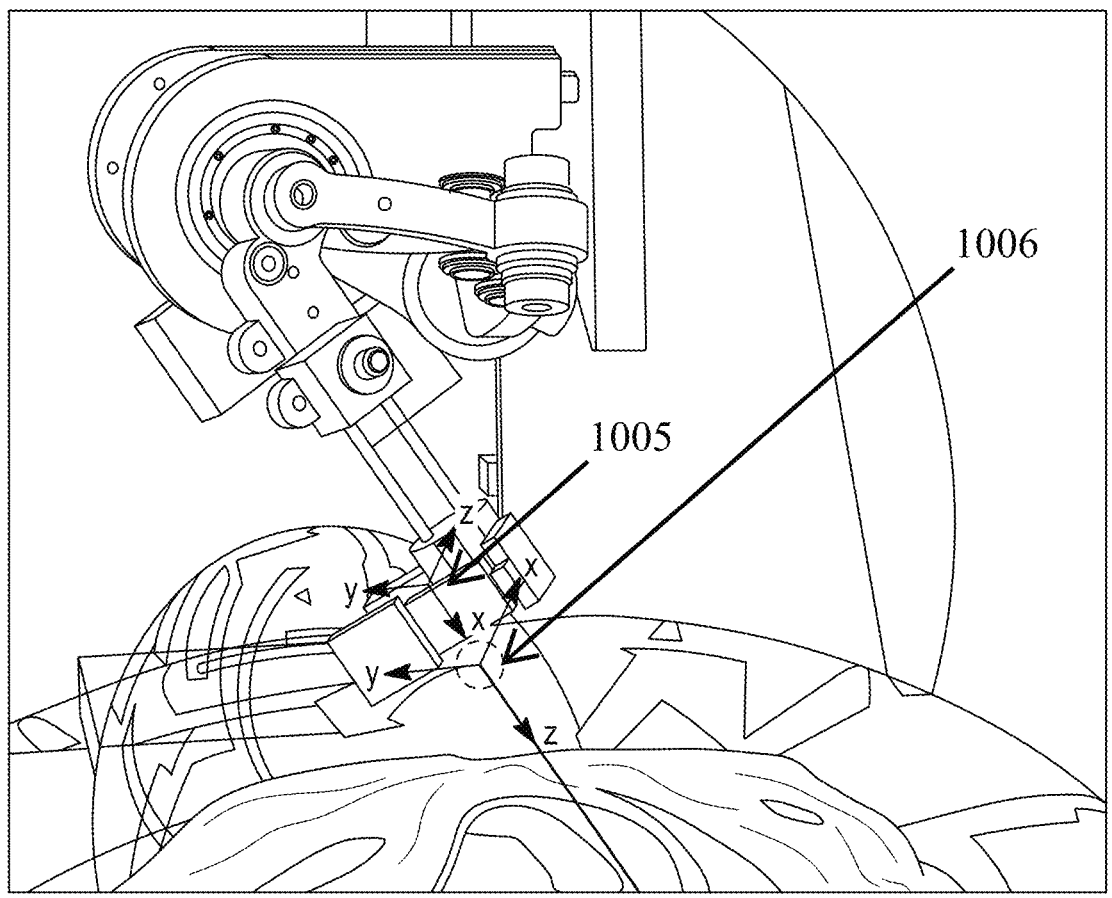
FIG. 34 shows a visualization of the virtual environment highlighting the needle insertion mechanism tip pose and medical instrument insertion pose.

Medical Instrument Insertion Pose controller is implemented as a damped least squares gradient descent problem. This method provides closed-loop feedback on the Medical Instrument Insertion Pose error compensating for errors including link deflection. The corresponding controller block diagram is illustrated in FIG. 33. Medical Instrument Insertion Pose errors are calculated for position and orientation as $$e_{pos} = x_{targ} - x_{meas}, \text{ and}$$

$$e_{ori} = L(z_{targ}, z_{meas})(z_{targ} \times z_{meas})$$

where $$L(z_{targ}, z_{meas}) = \cos^{-1}\left(\frac{z_{targ}^T z_{meas}}{\|z_{targ}\|_2 \|z_{meas}\|_2}\right).$$

$x_{targ}$ and $x_{meas}$ are target and measured translation vectors of the target tip transform, $^B T_{Tpt}$, and measured tip transform, $^B T_{Tpm}$. $z_{targ}$ and $z_{meas}$ are the Z axis vectors of the rotation sub-matrix of $^B T_{Tpt}$ and $^B T_{Tpm}$. The target transform described by $^B T_{Tpt}$ is provided from the User Interface. The measured tip transform in the robot base frame is calculated as $^B T_{Tpm} = {}^B T_{Tr} {}^{Tr}T_{Tp} {}^{Tp}T_{Tmiip}$ where $^{Tr}T_{Tp}$ is the tip tracker's pose in the tracker's base frame and $^{TP}T_{Tmiip}$ is the transform between the tip tracking sensor pose and the Target Medical Instrument Insertion Pose 2901. The transform from the robot's base frame to the tracker's base frame, $^B T_{Tr}$, is found by solving a least squares transform between $^{Tr}T_{Tpm}$ and $^B T_{Tp}$ based on an initialization sequence. As needles are symmetric, the orientation error does not include rotation around the EE's z-axis. The base to tip tracking sensor As $^{Tr}T_{Tpm}$ is not directly measured The joint angle setpoint update is calculated as $$q_{set} \leftarrow q_{est} + \Delta q \text{ where}$$

$$\Delta q = K_{pos} J_{pos}^\dagger e_{pos} + K_{ori} J_{ori}^\dagger e_{ori}$$

where the current end-effector position and orientation Jacobians, $J_{pos} \in \mathbb{R}^{3 \times 8}$ and $J_{ori} \in \mathbb{R}^{3 \times 8}$, come from the forward kinematics and is evaluated near the current joint angles $q_{est}$ and $J^\dagger$ is the psuedoinverse calculated via the Levenberg-Marquardt algorithm. $K_{pos}$ and $K_{ori}$ are the proportionality control constants for the end-effector controller.

Figure 32:
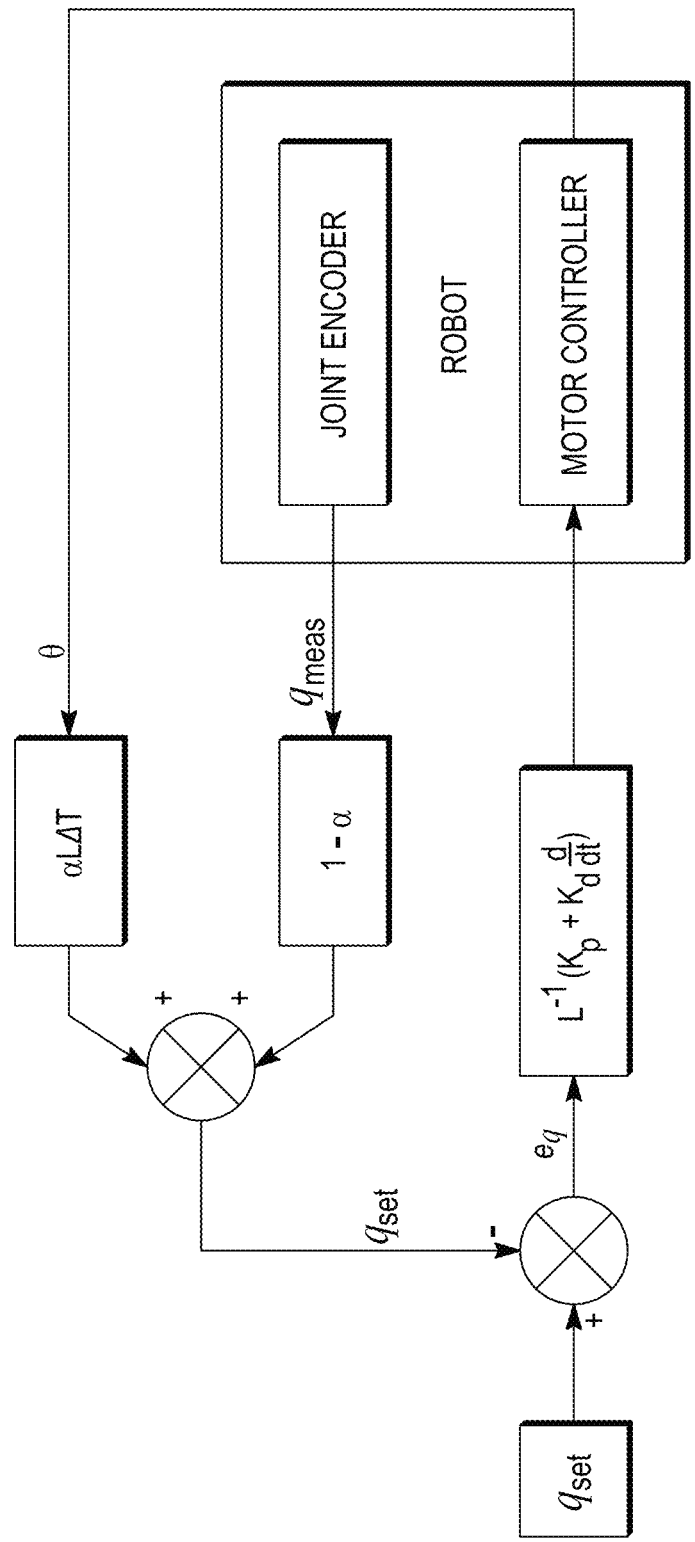
FIG. 32 shows a schematic diagram of the control process used in the joint controller.

Shown in FIG. 32, joint control does not directly match motor control due to cable stretch and hysteresis, therefore feedback control is performed off the filtered joint state. Magnetic joint encoders are low pass filtered due to their higher noise than the optical motor encoders.

Experimental Results

We present a teleoperated 8-DoF, low-profile and highly dexterous robotic needle placement platform for efficient and accurate needle insertion across the human abdominal region. System backlash is low and through closed-loop control. End-effector error is greatly decreased providing the performance required for effective needle insertion in robotic applications. Repeatability with a trajectory tracking positional accuracy of 0.27 mm and orientation accuracy of 0.7°. Minimal shadowing and artifacts are visible in the CT image. A clutching mechanism is included which enables long-needle insertions in an easy-to-manufacture and sterilizable assembly. Using our Automated Robot Trajectory Planning Method, we can achieve high dexterity with success on simulated retrospective clinical procedures and able to reach across the body.

Certain aspects of the imaging device described herein are presented in the foregoing description and illustrated in the accompanying drawing using electronic hardware, computer software, or any combination thereof. Whether such elements are implemented as hardware or software depends upon the particular application and design constraints imposed on the overall system. By way of example, such elements, or any portion of such elements, or any combination of such elements may be implemented with one or more processors or controllers. Examples of processors or controllers include microprocessors, microcontrollers, digital signal processors (DSPs), field programmable gate arrays (FPGAs), programmable logic devices (PLDs), state machines, gated logic, discrete hardware circuits, and any other suitable hardware configured to perform the various functionalities described throughout this disclosure. Examples of processors or controllers may also include general-purpose computers or computing platforms selectively activated or reconfigured by code to provide the necessary functionality.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein but may be modified within the scope and equivalents of the appended claims.

What is claimed is:

1. A surgical robotic platform for operating within a constrained space of an imaging scanner in which a patient resides, comprising:
   a gross positioning stage providing three degrees of freedom for providing larger-scale motion and configured to be located outside of the constrained space; and
   an end-effector having a shaft extending from the gross positioning stage and into the constrained space of the imaging scanner, the shaft having a proximal end operatively coupled to the gross positioning stage outside of the constrained space and a distal end configured to be located in the constrained space, the distal end having a medical instrument gripper for holding a medical instrument used in a percutaneous procedure, the end-effector further including a joint arrangement operatively coupling the shaft to the medical gripper for providing smaller scale motion to the medical instrument gripper for enabling position and/or orientation control of the medical instrument, the proximal end of the shaft further including a drive module for controlling joints in the joint arrangement such that in use the drive module remains external of the constrained space and the joint arrangement is located in the constrained space, the drive module actuating joints to thereby provide two active degrees of freedom for the end-effector, wherein the gross positioning stage, the end-effector and the drive module collectively provide two additional degrees of freedom that are redundant degrees of freedom wherein at least one of the redundant degrees of freedom enables multiple configurations for reaching the target needle insertion pose.

2. The surgical robotic platform of claim 1, wherein the gross positioning stage is an active or passive gross positioning stage.

3. The surgical robotic platform of claim 1, wherein the gross positioning stage is manually positionable and gravity compensated.

4. The surgical robotic platform of claim 1, wherein the drive module is operatively coupled to the joint arrangement by a flexible cable transmission.

5. The surgical robotic platform of claim 1, wherein the end-effector is manually positionable.

6. The surgical robotic platform of claim 1, wherein the joint arrangement includes a needle insertion mechanism that is passive.

7. The surgical robotic platform of claim 1, wherein the drive module is operatively coupled to the joint arrangement by a flexible belt or band transmission.

8. The surgical robotic platform of claim 1, wherein the joint arrangement includes a tip tracker to enhance platform accuracy.

9. The surgical robotic platform of claim 1, wherein the joint arrangement includes joint encoders to enhance platform accuracy.

10. The surgical robotic platform of claim 1, wherein a base of the gross positioning stage is mountable to the imaging scanner or a patient couch on which the patient resides.

11. The surgical robotic platform of claim 1, wherein a base of the gross positioning stage is mountable independent of the imaging scanner.

12. The surgical robotic platform of claim 1, wherein a needle insertion mechanism in the joint arrangement includes a needle gripper having helically wrapped Shape Memory Alloy actuator.

13. The surgical robotic platform of claim 1, wherein the gross positioning stage has prismatic joint and/or revolute joints.

14. The surgical robotic platform of claim 1, wherein the medical instrument mechanism is able to incrementally insert the medical instrument using two medical instrument grippers, where only one of the two medical instrument grippers advances the medical instrument at any one time.

15. The surgical robotic platform of claim 1, wherein the joint with two degrees of freedom includes a roll and pitch joint.

16. The surgical robotic platform of claim 1, wherein the joint with two degrees of freedom includes a roll and yaw joint.

17. The surgical robotic platform of claim 1, wherein the joint with two degrees of freedom includes a pitch and yaw joint.

18. The surgical robotic platform of claim 1 wherein the joint actuated by the drive module has two degrees of freedom in the joint arrangement.

19. The surgical robotic platform of claim 1 wherein the shaft of the end-effector is a rotatable shaft.

20. The surgical robotic platform of claim 1 wherein the end-effector includes a roll joint and a pitch joint.

21. The surgical robotic platform of claim 1 wherein the joint arrangement includes joints that are remotely actuatable via joint cables.

22. The surgical robotic platform of claim 21 wherein the joint arrangement includes idler pulleys that guide the joint cables throughout the end-effector.

23. The surgical robotic platform of claim 1 wherein the gross positioning stage utilizes a ball-screw transmission.

24. The surgical robotic platform of claim 1, wherein the joint arrangement includes a joint dedicated for needle insertion.

25. A surgical robotic platform for operating within a constrained space of an imaging scanner in which a patient resides, comprising:

a gross positioning stage providing three degrees of freedom for providing larger-scale motion and configured to be located outside of the constrained space; and an end-effector having a shaft extending from the gross positioning stage and into the constrained space of the imaging scanner, the shaft having a proximal end operatively coupled to the gross positioning stage outside of the constrained space and a distal end configured to be located in the constrained space, the distal end having a medical instrument gripper for holding a medical instrument used in a percutaneous procedure, the end-effector further including a joint arrangement operatively coupling the shaft to the medical gripper for providing smaller scale motion to the medical instrument gripper for enabling position and/or orientation control of the medical instrument, the proximal end of the shaft further including a drive module and trunnion for controlling joints in the joint arrangement such that in use the drive module and trunnion is able to remain external of the constrained space and the joint arrangement is able to be located in the constrained space, the trunnion and drive module actuating joints to thereby provide two active degrees of freedom for the end-effector, wherein the gross positioning stage, the end-effector and the drive module collectively provide two additional degrees of freedom that are redundant degrees of freedom wherein at least one of the redundant degrees of freedom enables multiple configurations for reaching the target needle insertion pose.

26. The surgical robotic platform of claim 25, wherein the gross positioning stage is manually positionable and gravity compensated.

27. The surgical robotic platform of claim 25, wherein the end-effector includes a roll joint and a pitch joint.

28. The surgical robotic platform of claim 25 wherein the shaft of the end-effector is a rotatable shaft.

29. The surgical robotic platform of claim 25, wherein the end-effector is manually positionable.

* * * * *